(12) United States Patent
Pang

(10) Patent No.: US 12,563,039 B2
(45) Date of Patent: Feb. 24, 2026

(54) USER PRIVACY PROTECTION METHOD, APPARATUS, AND SYSTEM

(71) Applicant: Honor Device Co., Ltd., Shenzhen (CN)

(72) Inventor: Gaokun Pang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 78 days.

(21) Appl. No.: 18/685,128

(22) PCT Filed: Sep. 9, 2022

(86) PCT No.: PCT/CN2022/118220
§ 371 (c)(1),
(2) Date: Feb. 20, 2024

(87) PCT Pub. No.: WO2023/087873
PCT Pub. Date: May 25, 2023

(65) Prior Publication Data
US 2025/0133080 A1 Apr. 24, 2025

(30) Foreign Application Priority Data
Nov. 17, 2021 (CN) .......................... 202111360969.6

(51) Int. Cl.
*H04L 9/40* (2022.01)
(52) U.S. Cl.
CPC ................................ *H04L 63/0876* (2013.01)

(58) Field of Classification Search
CPC ........... H04L 63/0876; H04W 12/069; H04W 12/71; H04W 12/02; H04W 12/06; H04W 12/03; H04W 12/30
See application file for complete search history.

(56) References Cited

U.S. PATENT DOCUMENTS 10,623,951 B2     4/2020  Palanigounder et al.
11,997,635 B2 *   5/2024  Duo ................... G06K 7/10722
(Continued)

FOREIGN PATENT DOCUMENTS

CN        101155092 A     4/2008
CN        101155092 B     9/2010
(Continued)

*Primary Examiner* — Mohammed Waliullah
(74) *Attorney, Agent, or Firm* — Conley Rose, P.C.

(57) ABSTRACT
A user privacy protection method, an apparatus, and a system. The method includes: obtaining a first random number; determining a first identifier according to the first random number; sending a first message carrying the first identifier to a second device, where the first message indicates the second device to perform authentication with a first device according to a cached result corresponding to the first identifier; establishing a connection to the second device in a case that the authentication succeeds; obtaining a second random number; updating the first identifier according to the second random number to obtain the updated first identifier; and sending a second message carrying the updated first identifier to the second device, where the second message indicates the second device to perform authentication with the first device according to a cached result corresponding to the updated first identifier.

20 Claims, 6 Drawing Sheets

(56)                    References Cited

U.S. PATENT DOCUMENTS

| | | | |
|---|---|---|---|
| 12,207,083 B2 * | 1/2025 | Palanigounder .... | H04W 12/041 |
| 2003/0026426 A1 * | 2/2003 | Wright ............... | H04L 63/0807 |
| | | | 713/153 |
| 2016/0135053 A1 | 5/2016 | Lee et al. | |
| 2017/0265069 A1 * | 9/2017 | Palanigounder ...... | H04W 12/08 |
| 2022/0386117 A1 * | 12/2022 | Henry .................. | H04W 12/06 |

FOREIGN PATENT DOCUMENTS

| | | | |
|---|---|---|---|
| CN | 103096307 A | 5/2013 | |
| CN | 103391540 A | 11/2013 | |
| CN | 103596179 A | 2/2014 | |
| CN | 103795728 A | 5/2014 | |
| CN | 108012269 A | 5/2018 | |
| CN | 108449755 A | 8/2018 | |
| CN | 108702626 A | * 10/2018 ............ H04W 12/08 |

* cited by examiner

USER PRIVACY PROTECTION METHOD, APPARATUS, AND SYSTEM

CROSS-REFERENCE TO RELATED APPLICATIONS

This is a U.S. National Stage of International Application No. PCT/CN2022/118220 filed on Sep. 9, 2022, which claims priority to Chinese Patent Application No. 202111360969.6, filed with the China National Intellectual Property Administration on Nov. 17, 2021, both of which are incorporated herein by reference in their entireties.

TECHNICAL FIELD

This application relates to the field of communication technologies, and in particular, to a user privacy protection method, an apparatus, and a system.

BACKGROUND

Wireless fidelity (wireless fidelity, WiFi) technology has advantages of rapid deployment, convenient use, and high transmission rate, and has developed rapidly and is now widely used in various industries.

In the WiFi technology, if a terminal device needs to access a WiFi network, the terminal device needs to establish a connection to an access device of the WiFi network. In the connection establishment process, the terminal device needs to exchange some identification information with the access device, such as a media access control (MAC) address or a pairwise master key identifier (pairwise master key identifier, PMKID). In a communication process between the terminal device and the access device, if the identification information is not protected and leaked, a threat is posed to user privacy (such as a mobile phone number of a user).

Currently, to protect user privacy, for some identification information, such as a MAC address, that is exchanged between the terminal device and the access device, the terminal device or the access device uses a temporary MAC address, so that the outside world cannot directly obtain user privacy through the temporary MAC address. However, for some other identification information, such as a PMKID, that is exchanged between the terminal device and the access device, there is no relevant protection solution in the process in which the terminal device accesses the WiFi network, and there is still a risk of leakage of the identification information.

SUMMARY

Embodiments of this application provide a user privacy protection method, an apparatus, and a system, to solve a problem that identification information used for interaction is easily leaked during access to a wireless network.

To achieve the foregoing objective, the following technical solutions are used in embodiments of this application.

According to a first aspect, a user privacy method is provided, where the method includes: obtaining a first random number; determining a first identifier according to the first random number; sending a first message carrying the first identifier to a second device, where the first message indicates the second device to perform authentication with a first device according to a cached result corresponding to the first identifier; establishing a connection to the second device in a case that the authentication succeeds; obtaining a second random number; updating the first identifier according to the second random number to obtain the updated first identifier; and sending a second message carrying the updated first identifier to the second device, where the second message indicates the second device to perform authentication with the first device according to a cached result corresponding to the updated first identifier. Based on the user privacy protection method provided in embodiments of this application, the first identifier can be generated based on the random number, and the first identifier can be updated after the connection is established. Different from the current solution of fixing the first identifier, according to this solution, the generated first identifier is not easily leaked, thereby protecting user information security when accessing the network.

With reference to the first aspect, in a possible implementation, the obtaining a first random number includes: generating the first random number; or receiving the first random number from the second device; or receiving the first random number from a third device. Based on this solution, a plurality of manners of obtaining the first random number are provided, which can be applied in different scenarios.

With reference to the first aspect, in a possible implementation, the obtaining a second random number includes: generating the second random number; or receiving the second random number from the second device; or receiving the second random number from the third device. Based on this solution, a plurality of manners of obtaining the second random number are provided, which can be applied in different scenarios.

With reference to the first aspect, in a possible implementation, the first identifier is obtained by performing one or more hash operations based on a public key of the first device, a public key of the second device, and the first random number. Based on this solution, a manner of determining the first identifier is provided.

With reference to the first aspect, in a possible implementation, the determining a first identifier according to the first random number includes: obtaining a third random number; and determining the first identifier according to the first random number and the third random number. Based on this solution, two random numbers can be used to determine the first identifier to further protect the first identifier.

With reference to the first aspect, in a possible implementation, the obtaining a third random number includes: generating the third random number; or receiving the third random number from the second device; or receiving the third random number from the third device. Based on this solution, a plurality of manners of obtaining the third random number are provided, which can be applied in different scenarios.

With reference to the first aspect, in a possible implementation, the updating the first identifier according to the second random number includes: obtaining a fourth random number; and updating the first identifier according to the second random number and the fourth random number to obtain the updated first identifier. Based on this solution, two random numbers can be used to update the first identifier to further protect the first identifier.

With reference to the first aspect, in a possible implementation, the obtaining a fourth random number includes: generating the fourth random number; or receiving the fourth random number from the second device; or receiving the fourth random number from the third device. Based on this solution, a plurality of manners of obtaining the fourth random number are provided, which can be applied in different scenarios.

With reference to the first aspect, in a possible implementation, the first random number is a first temporary media access control MAC address of the first device; and the third random number is a first temporary media access control MAC address of the second device. Based on this solution, the temporary MAC addresses of the devices at both ends can be used to determine the first identifier without consuming resources to obtain additional random numbers.

With reference to the first aspect, in a possible implementation, the first random number is a first temporary MAC address of the first device; the third random number is a first temporary MAC address of the second device; the second random number is a second temporary MAC address of the first device obtained by updating the first temporary MAC address of the first device; and the fourth random number is a second temporary MAC address of the second device obtained by updating the first temporary MAC address of the second device. Based on this solution, when updating the temporary MAC addresses, the devices at both ends can synchronously update the first identifier according to the updated temporary MAC addresses without consuming resources to obtain additional random numbers for updating the first identifier.

With reference to the first aspect, in a possible implementation, the first identifier is obtained by performing one or more hash operations based on the public key of the first device, the public key of the second device, the first random number, and the third random number; or the first identifier is obtained by performing one or more hash operations based on a first key corresponding to the first identifier, the first random number, and the third random number. Based on this solution, a plurality of manners of determining the first identifier are provided.

With reference to the first aspect, in a possible implementation, the first identifier is a pairwise master key identifier PMKID, and the first key is a pairwise master key PMK. According to this solution, the PMKID can be calculated through the PMK.

With reference to the first aspect, in a possible implementation, before the determining a first identifier according to the first random number, the method further includes: sending a third message to the second device, where the third message includes signature information of the first device, and the third message is used for requesting the second device to perform verification on the first device according to the signature information of the first device; and receiving a fourth message from the second device in a case that the verification performed by the second device on the first device succeeds, where the fourth message includes signature information of the second device, and the fourth message is used for requesting to perform verification on the second device according to the signature information of the second device; and the determining a first identifier according to the first random number includes: determining the first identifier according to the first random number in a case that the verification on the second device succeeds. Based on this solution, the first device and the second device can mutually perform authentication on each other before determining the first identifier, thereby further protecting information security.

With reference to the first aspect, in a possible implementation, the first message is an association request message, a re-association request message, or a fast initial link setup FILS association message. Based on this solution, the first identifier can be carried through a variety of messages, which is applied in different scenarios.

With reference to the first aspect, in a possible implementation, that the first message indicates the second device to perform authentication with the first device according to a cached result corresponding to the first identifier includes: the first message indicates the second device to perform 4-way handshake with the first device according to the cached result corresponding to the first identifier; or the first message indicates the second device to perform FILS authentication with the first device according to the cached result corresponding to the first identifier. Based on this solution, the second device can perform various authentication manners with the first device, which can be applied in different scenarios.

With reference to the first aspect, in a possible implementation, the first identifier is a PMKID. This solution can be applied to determining the PMKID in a scenario of accessing WiFi.

According to a second aspect, a user privacy method is provided, where the method includes: obtaining a first random number; determining a first identifier according to the first random number; receiving a first message from a first device, where the first message carries the first identifier, and the first message indicates a second device to perform authentication with the first device according to a cached result corresponding to the first identifier; determining, in response to determining that the first identifier determined by the second device is the same as the first identifier carried by the first message, that there is a cached result corresponding to the first identifier, and performing authentication with the first device; establishing a connection to the first device in a case that the authentication succeeds; obtaining a second random number, and updating the first identifier according to the second random number to obtain the updated first identifier; and receiving a second message from the first device, where the second message carries the updated first identifier, and the second message indicates the second device to perform authentication with the first device according to a cached result corresponding to the updated first identifier. Based on the user privacy protection method provided in embodiments of this application, the first identifier can be generated based on the random number, and the first identifier can be updated after the connection is established. Different from the current solution of fixing the first identifier, according to this solution, the generated first identifier is not easily leaked, thereby protecting user information security when accessing the network.

With reference to the second aspect, in a possible implementation, the obtaining a first random number includes: generating the first random number; or receiving the first random number from the first device; or receiving the first random number from a third device. Based on this solution, a plurality of manners of obtaining the first random number are provided, which can be applied in different scenarios.

With reference to the second aspect, in a possible implementation, the obtaining a second random number includes: generating the second random number; or receiving the second random number from the first device; or receiving the second random number from the third device. Based on this solution, a plurality of manners of obtaining the second random number are provided, which can be applied in different scenarios.

With reference to the second aspect, in a possible implementation, the first identifier is obtained by performing one or more hash operations based on a public key of the first device, a public key of the second device, and the first random number. Based on this solution, a manner of determining the first identifier is provided.

With reference to the second aspect, in a possible implementation, the determining a first identifier according to the first random number includes: obtaining a third random number; and determining the first identifier according to the first random number and the third random number. Based on this solution, two random numbers can be used to determine the first identifier to further protect the first identifier.

With reference to the second aspect, in a possible implementation, the obtaining a third random number includes: generating the third random number; or receiving the third random number from the first device; or receiving the third random number from the third device. Based on this solution, a plurality of manners of obtaining the third random number are provided, which can be applied in different scenarios.

With reference to the second aspect, in a possible implementation, the updating the first identifier according to the second random number includes: obtaining a fourth random number; and updating the first identifier according to the second random number and the fourth random number to obtain the updated first identifier. Based on this solution, two random numbers can be used to update the first identifier to further protect the first identifier.

With reference to the second aspect, in a possible implementation, the obtaining a fourth random number includes: generating the fourth random number; or receiving the fourth random number from the first device; or receiving the fourth random number from the third device. Based on this solution, a plurality of manners of obtaining the fourth random number are provided, which can be applied in different scenarios.

With reference to the second aspect, in a possible implementation, the first random number is a first temporary media access control MAC address of the first device; and the third random number is a first temporary media access control MAC address of the second device. Based on this solution, the temporary MAC addresses of the devices at both ends can be used to determine the first identifier without consuming resources to obtain additional random numbers.

With reference to the second aspect, in a possible implementation, the first random number is a first temporary MAC address of the first device; the third random number is a first temporary MAC address of the second device; the second random number is a second temporary MAC address of the first device obtained by updating the first temporary MAC address of the first device; and the fourth random number is a second temporary MAC address of the second device obtained by updating the first temporary MAC address of the second device. Based on this solution, when updating the temporary MAC addresses, the devices at both ends can synchronously update the first identifier according to the updated temporary MAC addresses without consuming resources to obtain additional random numbers for updating the first identifier.

With reference to the second aspect, in a possible implementation, the first identifier is obtained by performing one or more hash operations based on the public key of the first device, the public key of the second device, the first random number, and the third random number; or the first identifier is obtained by performing one or more hash operations based on a first key corresponding to the first identifier, the first random number, and the third random number. Based on this solution, a plurality of manners of determining the first identifier are provided.

With reference to the second aspect, in a possible implementation, the first identifier is a pairwise master key identifier PMKID, and the first key is a pairwise master key PMK. According to this solution, the PMKID can be calculated through the PMK.

With reference to the second aspect, in a possible implementation, the determining a first identifier according to the first random number includes: receiving a third message from the first device, where the third message includes signature information of the first device, and the third message is used for requesting the second device to perform verification on the first device according to the signature information of the first device; and determining the first identifier according to the first random number in a case that the verification performed by the second device on the first device succeeds. The receiving a first message from the first device includes: sending a fourth message to the first device, where the fourth message includes signature information of the second device, and the fourth message is used for requesting to perform verification on the second device according to the signature information of the second device; and receiving the first message from the first device in a case that the verification performed by the first device on the second device succeeds. Based on this solution, the first device and the second device can mutually perform authentication on each other before determining the first identifier, thereby further protecting information security.

With reference to the second aspect, in a possible implementation, the first message is an association request message, a re-association request message, or a fast initial link setup FILS association message. Based on this solution, the first identifier can be carried through a variety of messages, which is applied in different scenarios. With reference to the second aspect, in a possible implementation, that the first message indicates the second device to perform authentication with the first device according to a cached result corresponding to the first identifier includes: the first message indicates the second device to perform 4-way handshake with the first device according to the cached result corresponding to the first identifier; or the first message indicates the second device to perform FILS authentication with the first device according to the cached result corresponding to the first identifier. Based on this solution, the second device can perform various authentication manners with the first device, which can be applied in different scenarios.

With reference to the second aspect, in a possible implementation, the first identifier is a PMKID. This solution can be applied to determining the PMKID in a scenario of accessing WiFi.

According to a third aspect, a communication apparatus is provided. The communication apparatus has a function of implementing the method according to the first aspect. This function may be implemented by using hardware, or may be implemented by executing corresponding software by hardware. The hardware or the software includes one or more modules corresponding to the foregoing function. For example, the communication apparatus may include a transceiver module and a processing module, where the processing module is configured to obtain a first random number; the processing module is further configured to determine a first identifier according to the first random number; the transceiver module is configured to send a first message carrying the first identifier to a second device, where the first message indicates the second device to perform authentication with the communication apparatus according to a cached result corresponding to the first identifier; and the communication apparatus establishes a connection to the second device in a case that the authentication succeeds; the processing module is further configured to obtain a second random number; the processing module is further configured to update the first identifier according to the second random number to obtain the updated first identifier; and the transceiver module is further configured to send a second message carrying the updated first identifier to the second device, where the second message indicates the second device to perform authentication with the communication apparatus according to a cached result corresponding to the updated first identifier.

With reference to the third aspect, in a possible implementation, that the processing module is configured to obtain a first random number includes: the processing module is configured to generate the first random number; or the processing module is configured to receive the first random number from the second device through the transceiver module; or the processing module is configured to receive the first random number from a third device through the transceiver module.

With reference to the third aspect, in a possible implementation, that the processing module is configured to obtain a second random number includes: the processing module is configured to generate the second random number; or the processing module is configured to receive the second random number from the second device through the transceiver module; or the processing module is configured to receive the second random number from the third device through the transceiver module.

With reference to the third aspect, in a possible implementation, the first identifier is obtained by performing one or more hash operations based on a public key of the communication apparatus, a public key of the second device, and the first random number.

With reference to the third aspect, in a possible implementation, that the processing module is further configured to determine a first identifier according to the first random number includes: the processing module is configured to obtain a third random number; and determine the first identifier according to the first random number and the third random number.

With reference to the third aspect, in a possible implementation, that the processing module is configured to obtain a third random number includes: the processing module is configured to generate the third random number; or the processing module is configured to receive the third random number from the second device through the transceiver module; or the processing module is configured to receive the third random number from the third device through the transceiver module.

With reference to the third aspect, in a possible implementation, that the processing module is configured to update the first identifier according to the second random number includes: the processing module is configured to obtain a fourth random number, and update the first identifier according to the second random number and the fourth random number to obtain the updated first identifier.

With reference to the third aspect, in a possible implementation, that the processing module is configured to obtain a fourth random number includes: the processing module is configured to generate the fourth random number; or the processing module is configured to receive the fourth random number from the second device through the transceiver module; or the processing module is configured to receive the fourth random number from the third device through the transceiver module.

With reference to the third aspect, in a possible implementation, the first random number is a first temporary media access control MAC address of the communication apparatus; and the third random number is a first temporary media access control MAC address of the second device.

With reference to the third aspect, in a possible implementation, the first random number is a first temporary MAC address of the communication apparatus; the third random number is a first temporary MAC address of the second device; the fourth random number is a second temporary MAC address of the communication apparatus obtained by the communication apparatus by updating the first temporary MAC address of the communication apparatus; and the fifth random number is a second temporary MAC address of the second device obtained by the second device by updating the first temporary MAC address of the second device.

With reference to the third aspect, in a possible implementation, the first identifier is obtained by performing one or more hash operations based on the public key of the communication apparatus, the public key of the second device, the first random number, and the third random number; or the first identifier is obtained by performing one or more hash operations based on a first key corresponding to the first identifier, the first random number, and the third random number.

With reference to the third aspect, in a possible implementation, the first identifier is a pairwise master key identifier PMKID, and the first key is a pairwise master key PMK.

With reference to the third aspect, in a possible implementation, before the processing module determines the first identifier according to the first random number, the transceiver module is further configured to send a third message to the second device, where the third message includes signature information of the communication apparatus, and the third message is used for requesting the second device to perform verification on the first device according to the signature information of the communication apparatus; and in a case that the verification performed by the second device on the first device succeeds, the transceiver module is further configured to receive a fourth message from the second device, where the fourth message includes signature information of the second device, and the fourth message is used for requesting the communication apparatus to perform verification on the second device according to the signature information of the second device; and that the processing module is configured to determine a first identifier according to the first random number includes: the processing module is configured to determine the first identifier according to the first random number in a case that the verification performed by the processing module on the second device succeeds.

With reference to the third aspect, in a possible implementation, the first message is an association request message, a re-association request message, or a fast initial link setup FILS association message.

With reference to the third aspect, in a possible implementation, that the first message indicates the second device to perform authentication with the communication apparatus according to a cached result corresponding to the first identifier includes: the first message indicates the second device to perform 4-way handshake with the communication apparatus according to the cached result corresponding to the first identifier; or the first message indicates the second device to perform FILS authentication with the communication apparatus according to the cached result corresponding to the first identifier.

With reference to the third aspect, in a possible implementation, the first identifier is a PMKID.

According to a fourth aspect, a communication apparatus is provided. The communication apparatus has a function of implementing the method according to the second aspect. This function may be implemented by using hardware, or may be implemented by executing corresponding software by hardware. The hardware or the software includes one or more modules corresponding to the foregoing function. For example, the communication apparatus may include a transceiver module and a processing module, where the processing module is configured to obtain a first random number; the processing module is further configured to determine a first identifier according to the first random number; the transceiver module is configured to receive a first message from a first device, where the first message carries the first identifier, and the first message indicates the communication apparatus to perform authentication with the first device according to a cached result corresponding to the first identifier; the processing module is further configured to determine, in response to determining that the first identifier determined by the communication apparatus is the same as the first identifier carried by the first message, that there is a cached result corresponding to the first identifier, and perform authentication with the first device; the communication apparatus establishes a connection to the first device in a case that the authentication succeeds; the processing module is further configured to obtain a second random number, and update the first identifier according to the second random number to obtain the updated first identifier; and the transceiver module is further configured to receive a second message from the first device, where the second message carries the updated first identifier, and the second message indicates the communication apparatus to perform authentication with the first device according to a cached result corresponding to the updated first identifier.

With reference to the fourth aspect, in a possible implementation, that the processing module is configured to obtain a first random number includes: the processing module is configured to generate the first random number; or the processing module is configured to receive the first random number from the first device through the transceiver module; or the processing module is configured to receive the first random number from a third device through the transceiver module.

With reference to the fourth aspect, in a possible implementation, that the processing module is configured to obtain a second random number includes: the processing module is configured to generate the second random number; or the processing module is configured to receive the second random number from the first device through the transceiver module; or the processing module is configured to receive the second random number from the third device through the transceiver module.

With reference to the fourth aspect, in a possible implementation, the first identifier is obtained by performing one or more hash operations based on a public key of the first device, a public key of the second device, and the first random number.

With reference to the fourth aspect, in a possible implementation, that the processing module is further configured to determine a first identifier according to the first random number includes: the processing module is configured to obtain a third random number; and determine the first identifier according to the first random number and the third random number.

With reference to the fourth aspect, in a possible implementation, that the processing module is configured to obtain a third random number includes: the processing module is configured to generate the third random number; or the processing module is configured to receive the third random number from the first device through the transceiver module; or the processing module is configured to receive the third random number from the third device through the transceiver module.

With reference to the fourth aspect, in a possible implementation, that the processing module is configured to update the first identifier according to the second random number includes: the processing module is configured to obtain a fourth random number, and update the first identifier according to the second random number and the fourth random number to obtain the updated first identifier.

With reference to the fourth aspect, in a possible implementation, that the processing module is configured to obtain a fourth random number includes: the processing module is configured to generate the fourth random number; or the processing module is configured to receive the fourth random number from the first device through the transceiver module; or the processing module is configured to receive the fourth random number from the third device through the transceiver module.

With reference to the fourth aspect, in a possible implementation, the first random number is a first temporary media access control MAC address of the first device; and the third random number is a first temporary media access control MAC address of the communication apparatus.

With reference to the fourth aspect, in a possible implementation, the first random number is a first temporary MAC address of the first device; the third random number is a first temporary MAC address of the communication apparatus; the second random number is a second temporary MAC address of the first device obtained by updating the first temporary MAC address of the first device; and the fourth random number is a second temporary MAC address of the second device obtained by updating the first temporary MAC address of the communication apparatus.

With reference to the fourth aspect, in a possible implementation, the first identifier is obtained by performing one or more hash operations based on the public key of the first device, the public key of the communication apparatus, the first random number, and the third random number; or the first identifier is obtained by performing one or more hash operations based on a first key corresponding to the first identifier, the first random number, and the third random number.

With reference to the fourth aspect, in a possible implementation, the first identifier is a pairwise master key identifier PMKID, and the first key is a pairwise master key PMK.

With reference to the fourth aspect, in a possible implementation, that the processing module is configured to determine the first identifier according to the first random number includes: the processing module is configured to receive a third message from the first device through the transceiver module, where the third message includes signature information of the first device, and the third message is used for requesting the second device to perform verification on the first device according to the signature information of the first device; and the processing module determines the first identifier according to the first random number in a case that the verification performed by the processing module on the first device succeeds. That the transceiver module is configured to receive a first message from the first device includes: the transceiver module sends a fourth message to the first device, where the fourth message includes signature information of the second device, and the fourth message is used for requesting to perform verification on the second device according to the signature information of the second device; and receives the first message from the first device in a case that the verification performed by the first device on the communication apparatus succeeds.

With reference to the fourth aspect, in a possible implementation, the first message is an association request message, a re-association request message, or a fast initial link setup FILS association message.

With reference to the fourth aspect, in a possible implementation, that the first message indicates the communication apparatus to perform authentication with the first device according to a cached result corresponding to the first identifier includes: the first message indicates the communication apparatus to perform 4-way handshake with the first device according to the cached result corresponding to the first identifier; or the first message indicates the communication apparatus to perform FILS authentication with the first device according to the cached result corresponding to the first identifier.

With reference to the fourth aspect, in a possible implementation, the first identifier is a PMKID.

According to a fifth aspect, a communication apparatus is provided, and includes: a processor and a memory. The memory is configured to store computer executable instructions. When the communication apparatus runs, the processor executes the computer executable instructions stored in the memory, so that the communication apparatus performs the method according to any one of the first aspect.

According to a sixth aspect, a communication apparatus is provided, and includes: a processor and a memory. The memory is configured to store computer executable instructions. When the communication apparatus runs, the processor executes the computer executable instructions stored in the memory, so that the communication apparatus performs the method according to any one of the second aspect.

According to a seventh aspect, a communication apparatus is provided, and includes a processor. The processor is configured to perform, after being coupled to a memory and reading instructions in the memory, the method according to any one of the first aspect according to the instructions.

According to an eighth aspect, a communication apparatus is provided, and includes a processor. The processor is configured to perform, after being coupled to a memory and reading instructions in the memory, the method according to any one of the second aspect according to the instructions.

According to a ninth aspect, a computer-readable storage medium is provided. The computer-readable storage medium stores instructions. The instructions, when run on a computer, cause the computer to perform the method according to any one of the first aspect.

According to a tenth aspect, a computer-readable storage medium is provided. The computer-readable storage medium stores instructions. The instructions, when run on a computer, cause the computer to perform the method according to any one of the second aspect.

According to an eleventh aspect, a computer program product including instructions is provided. When the instructions are run on a computer, the computer is enabled to perform the method according to any one of the first aspect.

According to a twelfth aspect, a computer program product including instructions is provided. When the instructions are run on a computer, the computer is enabled to perform the method according to any one of the second aspect.

According to a thirteenth aspect, a communication system is provided, including a first device and a second device. The first device is configured to obtain a first random number; the second device is configured to obtain a first random number; the first device is further configured to determine a first identifier according to the first random number, and send a first message carrying the first identifier to the second device, where the first message indicates the second device to perform authentication with the first device according to a cached result corresponding to the first identifier; the second device is further configured to determine a first identifier according to the first random number; determine, in response to determining that the first identifier determined by the second device is the same as the first identifier carried by the first message, that there is a cached result corresponding to the first identifier; and perform authentication with the first device; the first device is further configured to establish a connection to the second device in a case that the authentication succeeds; the first device is further configured to obtain a second random number, and update the first identifier according to the second random number to obtain the updated first identifier; the second device is further configured to obtain a second random number, and update the first identifier according to the second random number to obtain the updated first identifier; and the first device is further configured to send a second message carrying the updated first identifier to the second device, where the second message indicates the second device to perform authentication with the first device according to a cached result corresponding to the updated first identifier.

For technical effects brought by any design manner of the third aspect to the thirteenth aspect, refer to technical effects brought by different design manners of the first aspect and the second aspect. Details are not described herein again.

DESCRIPTION OF EMBODIMENTS

Figure 1:
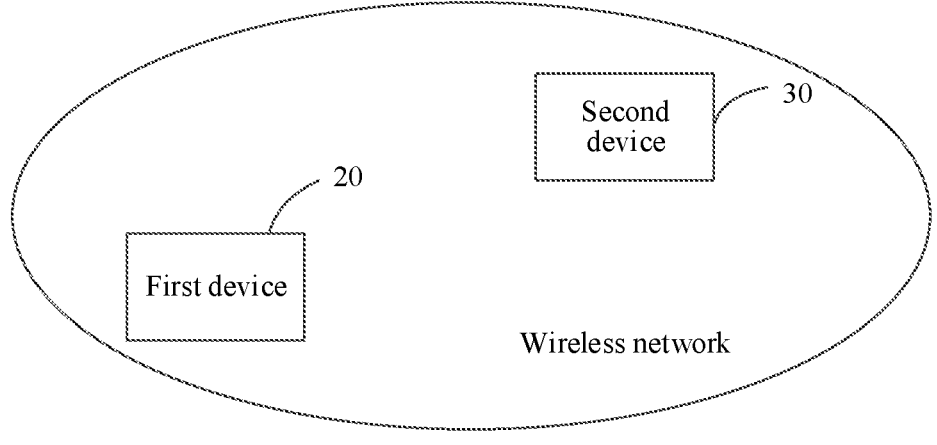
FIG. 1 is a schematic diagram of a structure of a communication system according to an embodiment of this application.

Before embodiments of this application are described in detail, for ease of understanding the technical solutions of embodiments of this application, a brief introduction is first given to the relevant technologies of this application below:

1. Radio Access Point (Access Point, AP):

The AP is a creator of a wireless network and a central node of the wireless network. The AP provides radio access services, allowing other wireless devices to access the wireless network and providing data access. For example, a wireless router used in a home or office is an AP.

2. Station (Station, STA):

Each terminal device connected to a wireless network may be referred to as a station, such as laptops, mobile phones and other devices connected to WiFi. In a process in which the STA accesses the wireless network, the AP needs to perform authentication on whether the STA has permission to establish a connection to the AP. After the authentication performed by the AP on the STA succeeds, the STA can establish a connection to the AP.

3. PMKID:

The PMKID is identification information generated by the STA and the AP to indicate a cached (cache) pairwise master key security association (pairwise master key security association, PMKSA). The PMKSA is a result cached after the STA and the AP are successfully authenticated, and may also be understood as cached data. The STA and the AP can perform authentication based on pre-shared key (pre-shared key, PSK) authentication (authentication), 802.1X authentication (full IEEE 802.1X authentication), extensible authentication protocol (extensible authentication Protocol, EAP) authentication, fast initial link setup (fast initial link setup, FILS) authentication, simultaneous authentication of equals (simultaneous authentication of equals, SAE), or other manners.

The PMKSA includes at least a key (key) required by the AP to perform authentication on the STA: a pairwise master key (pairwise master key, PMK) or a PSK. The PMKSA may further include: a life time (life time) of the PMKSA, a security policy (security policy) used, authentication and key management (authentication and key management, AKM), a MAC address, and other information.

After the STA is successfully authenticated for the first time, the AP generates a PMKSA, and the AP and STA generate the same PMKID to identify the PMKSA. When the STA subsequently accesses the AP again, the generated PMKID is sent to the AP. After the AP receives the PMKID, if it can be determined that the PMKSA indicated by the PMKID exists, the AP and STA can quickly perform authentication based on information in the PMKSA. For example, the AP can quickly perform authentication on the STA in a 4-way handshake (4-way handshake) manner or a fast initial link setup (Fast Initial Link Setup, FILS) authentication (FILS authentication) manner. Otherwise, it means that the STA sending the PMKID has not been successfully authenticated before and needs to re-initiate authentication, such as full IEEE 802.1X authentication.

As can be learned from the foregoing description, the PMKID can be used by the STA to access the AP. In the current solution, the PMKID generated by the STA and the AP is fixed. If the PMKID is leaked in the access process, the STA as a terminal device can easily be tracked, resulting in leakage of user privacy and security risks.

The following describes the technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A and B may be singular or plural. In addition, in descriptions of this application, unless otherwise specified, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. Moreover, in embodiments of this application, terms such as "illustrative" and "for example" are used for presenting an example, an instance, or an illustration. Any embodiment or design scheme described as an "example" or "for example" in embodiments of this application should not be explained as being more preferred or having more advantages than another embodiment or design scheme. To be precise, the terms such as "illustrative" and "for example" are intended to present a related concept in a specific manner to facilitate understanding.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

The terminal energy saving method provided in embodiments of this application can be applied to various communication systems. For example, the terminal energy saving method provided in embodiments of this application can be applied to a long term evolution (long term evolution, LTE) system or a fifth-generation (fifth-generation, 5G) system, or other similar new future-oriented systems. This is not specifically limited in embodiments of this application. In addition, the term "system" can be used interchangeably with "network".

FIG. 1 shows a communication system according to an embodiment of this application. The communication system includes one or more first devices 20 (FIG. 1 takes one first device 20 as an example), and a second device 30. The second device 30 is an access device of a wireless network, and the first device 20 can access the wireless network after establishing a connection to the second device 30. For example, the first device 20 in this embodiment of this application may be a terminal device (which may also be referred to as a STA after accessing the wireless network), and the second device may be an AP.

By using interaction between the second device 30 and any first device 20 shown in FIG. 1 as an example, the first device 20 obtains a first random number and determines a first identifier according to the first random number. The first device 20 sends a first message carrying the first identifier to the second device 30, where the first message indicates the second device 30 to perform authentication with the first device 20 according to a cached result corresponding to the first identifier. The first device 20 establishes a connection to the second device 30 in a case that the authentication succeeds. The first device 20 then obtains a second random number, and updates the first identifier according to the second random number to obtain the updated first identifier. The first device sends a second message carrying the updated first identifier to the second device, where the second message indicates the second device to perform authentication with the first device according to a cached result corresponding to the updated first identifier. A specific implementation and related technical effects of this solution are described in detail in subsequent method embodiments. Details are not described herein.

Optionally, the communication system provided in this embodiment of this application may further include a third device. The third device may be used to assign random numbers to the first device and/or the second device. In this embodiment of this application, the third device may be a device independent of the first device and the second device, such as a server for generating and allocating random numbers, or may be a specific network unit in the communication system. This is not limited in this application.

Optionally, the terminal device in embodiments of this application may be a device, such as a terminal or a chip that can be used in the terminal, configured to implement a wireless communication function. The terminal may also be referred to as user equipment (user equipment, UE), a mobile station, a mobile terminal, and the like. The terminal may be a mobile phone, a tablet computer, a computer with wireless transceiver function, a virtual reality terminal device, an augmented reality terminal device, a wireless terminal in industrial control, a wireless terminal in unmanned driving, a wireless terminal in remote surgery, a wireless terminal in smart grids, a wireless terminal in transportation security, a wireless terminal in smart cities, a wireless terminal in smart homes, and the like. A specific technology and a specific device form that are used by the terminal device are not limited in embodiments of this application.

Optionally, the first device 20 and the second device 30 in this embodiment of this application may also be referred to as communication apparatuses, and each may be a general-purpose device or a dedicated device. This is not specifically limited in this embodiment of this application.

Optionally, a related function of the first device 20 or the second device 30 in this embodiment of this application may be implemented by one device, or may be jointly implemented by a plurality of devices, or may be implemented by one or more functional modules in one device. This is not specifically limited in embodiments of this application. It may be understood that the function may be a network element in a hardware device, or may be a software function running on dedicated hardware, or may be a combination of hardware and software, or may be an instantiated virtualization function on a platform (for example, a cloud platform).

Figure 2:
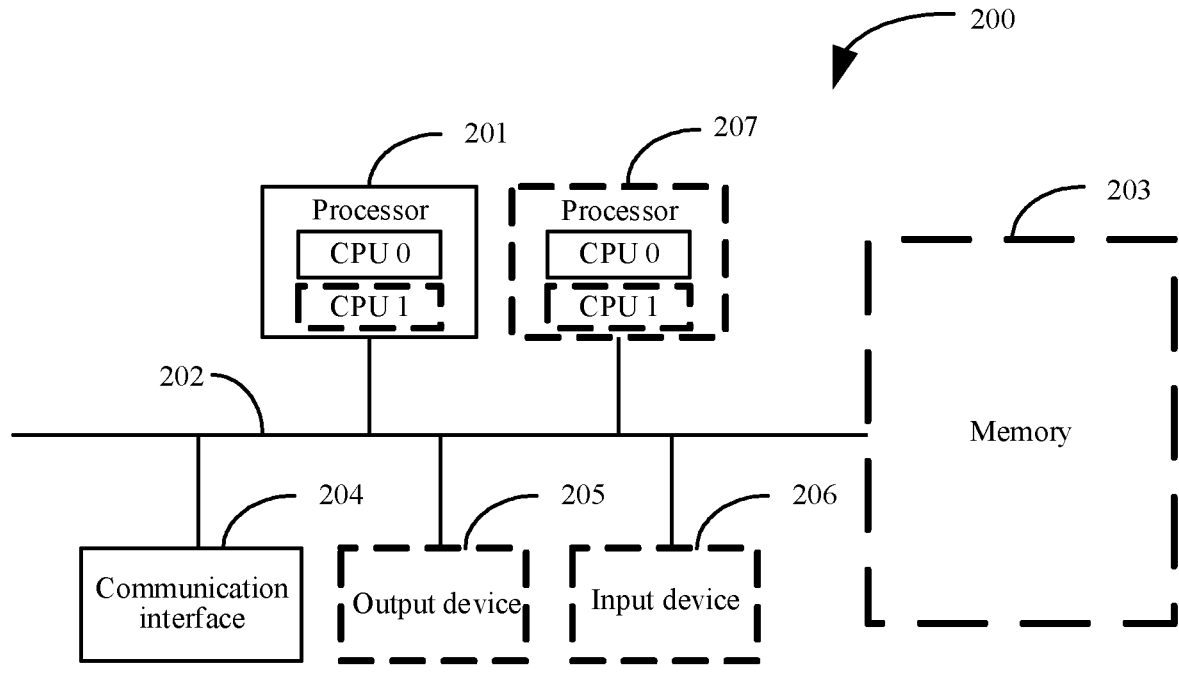
FIG. 2 is a schematic diagram of a structure of a communication apparatus according to an embodiment of this application.

For example, the related function of the first device 20 or the second device 30 in this embodiment of this application can be implemented through a communication apparatus 200 in FIG. 2. FIG. 2 is a schematic diagram of a structure of a communication apparatus 200 according to an embodiment of this application. The communication apparatus 200 includes one or more processors 201, a communication line 202, and at least one communication interface (FIG. 2 is described only by using an example in which a communication interface 204 and one processor 201 are included), and optionally, may further include a memory 203.

The processor 201 may be a general-purpose central processing unit (central processing unit, CPU), a microprocessor, an application-specific integrated circuit (application-specific integrated circuit, ASIC), or one or more integrated circuits configured to control execution of a program in the solutions of this application.

The communication line 202 may include a channel, to connect different components.

The communication interface 204 may be a transceiver module used to communicate with other devices or communication networks, such as Ethernet, a radio access network (radio access network, RAN), and a WLAN. For example, the transceiver module may be an apparatus such as a transceiver or a transceiver machine. Optionally, the communication interface 204 may alternatively be a transceiver circuit located in the processor 201 to implement signal input and signal output of the processor.

The memory 203 may be an apparatus having a storage function. For example, the memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory is not limited thereto. The memory may exist independently, and is connected to the processor by the communication line 202. The memory may be alternatively integrated with the processor.

The memory 203 is configured to store computer executable instructions for performing the solution in this application, and the processor 201 controls execution. The processor 201 is configured to execute the computer executable instructions stored in the memory 203 to implement the user privacy protection method provided in embodiments of this application.

Alternatively, optionally, in this embodiment of this application, the processor 201 may also perform functions related to processing in the user privacy protection method provided in the following embodiment of this application, and the communication interface 204 is responsible for communicating with other devices or communication networks. The embodiments of this application impose no specific limitation thereon.

Optionally, the computer executable instructions in this embodiment of this application may also be referred to as application code. This is not specifically limited in this embodiment of this application.

During specific implementation, in an embodiment, the processor 201 may include one or more CPUs, for example, a CPU 0 and a CPU 1 in FIG. 2.

During specific implementation, in an embodiment, the communication apparatus 200 may include a plurality of processors, for example, a processor 201 and a processor 207 in FIG. 2. Each of the processors may be a single-core (single-core) processor, or may be a multi-core (multi-core) processor. The processor may include, but is not limited to, at least one of the following: a central processing unit (central processing unit, CPU), a microprocessor, a digital signal processor (DSP), a microcontroller unit (microcontroller unit, MCU), an artificial intelligence processor, or various computing devices running software. Each computing device may include one or more cores for executing software instructions to perform operations or processing.

During specific implementation, in an embodiment, the communication apparatus 200 may further include an output device 205 and an input device 206. The output device 205 communicates with the processor 201, and may display information in a plurality of manners. For example, the output device 205 may be a liquid crystal display (liquid crystal display, LCD), a light emitting diode (light emitting diode, LED) display device, a cathode ray tube (cathode ray tube, CRT) display device, a projector (projector), or the like. The input device 206 communicates with the processor 201, and may receive an input from a user in a plurality of manners. For example, the input device 206 may be a mouse, a keyboard, a touchscreen device, or a sensor device.

The foregoing communication apparatus 200 may sometimes be referred to as a communication apparatus, which may be a general-purpose device or a dedicated device. For example, the communication apparatus 200 may be a desktop computer, a portable computer, a network server, a personal digital assistant (personal digital assistant, PDA), a mobile phone, a tablet computer, a wireless terminal device, an embedded device, the foregoing terminal device, the foregoing network device, or a device with a similar structure in FIG. 2. A type of the communication apparatus 200 is not limited in this embodiment of this application.

It may be understood that the structure shown in FIG. 2 constitutes no specific limitation on the communication apparatus 200. For example, in some other embodiments of this application, the communication apparatus 200 may include more or fewer components than those shown in the figure, or some components may be combined, or some components may be split, or components are arranged in different manners. The components shown in the figure may be implemented by hardware, software, or a combination of software and hardware.

Figure 3:
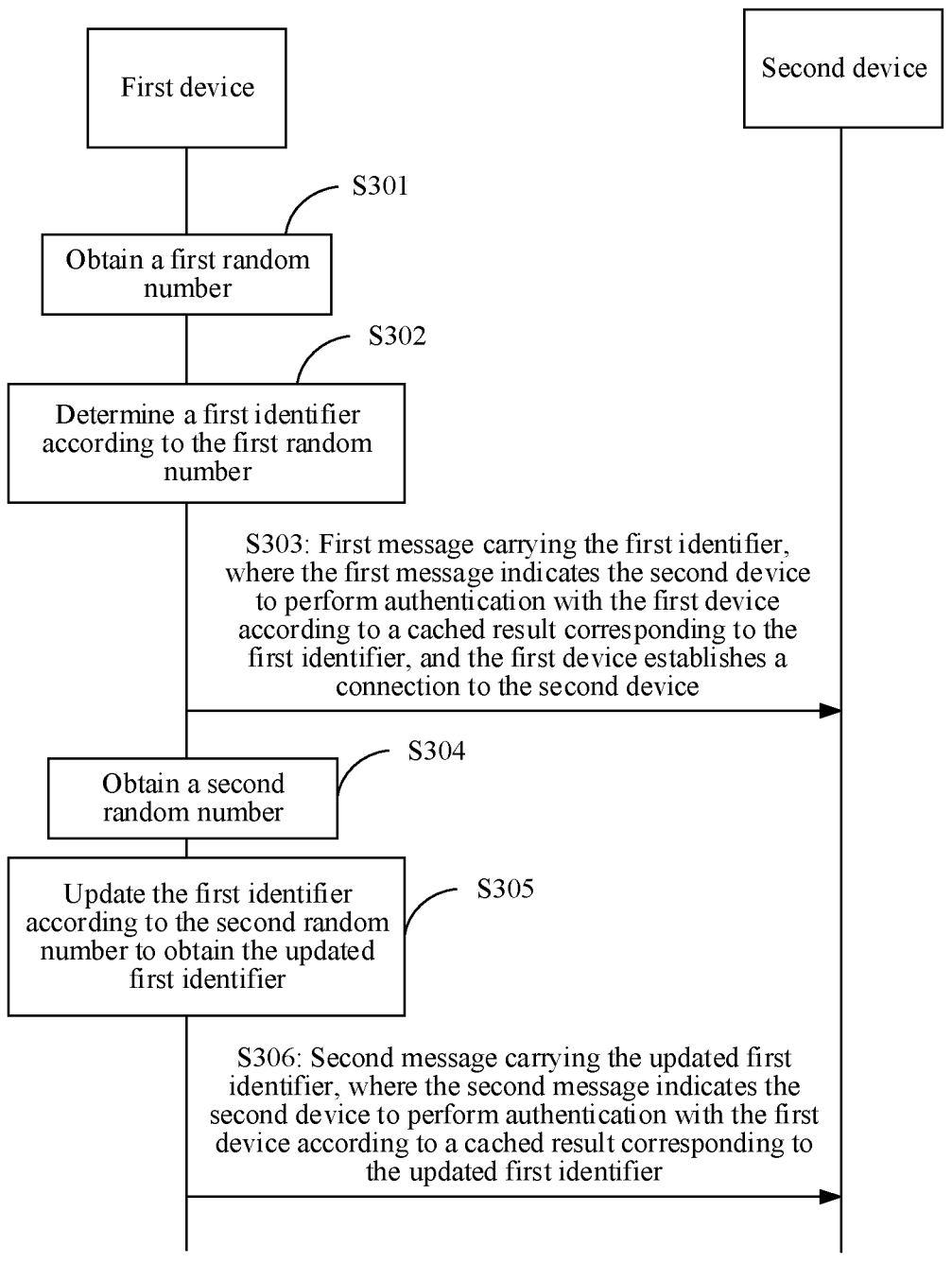
FIG. 3 is a schematic diagram of interaction of a user privacy protection method according to an embodiment of this application.

With reference to FIG. 1 and FIG. 2, the user privacy protection method provided in embodiments of this application is described below by using interaction between the second device 30 and any first device 20 that are shown in FIG. 1 as an example. As shown in FIG. 3, the user privacy protection method provided in this embodiment of this application includes the following steps S301 to S306:

S301: A first device obtains a first random number.

S302: The first device determines a first identifier according to the first random number.

S303: The first device sends a first message carrying the first identifier to a second device, where the first message indicates the second device to perform authentication with the first device according to a cached result corresponding to the first identifier. The first device establishes a connection to the second device in a case that the authentication succeeds.

S304: The first device obtains a second random number.

S305: The first device updates the first identifier according to the second random number to obtain the updated first identifier.

S306: The first device sends a second message carrying the updated first identifier to the second device, where the second message indicates the second device to perform authentication with the first device according to a cached result corresponding to the updated first identifier.

S301 to S303 are described below based on different scenarios.

Scenario 1: The first device and the second device determine (generate) the first identifier according to the first random number.

For S301, in this embodiment of this application, the first device may obtain the first random number in the following manner:

the first device generates the first random number; or the first device receives the first random number from the second device. Specifically, the second device sends the generated first random number to the first device.

Alternatively, the first device receives the first random number from a third device. Specifically, the third device sends the generated first random number to the first device. In this embodiment of this application, the third device may be a device independent of the first device and the second device, such as a server for generating and allocating random numbers.

In this embodiment of this application, the second device also needs to obtain the first random number. The second device may obtain the first random number in the following manner:

the second device generates the first random number; or the second device receives the first random number from the first device. Specifically, the first device sends the generated first random number to the second device.

Alternatively, the second device receives the first random number from the third device. Specifically, the third device sends the generated first random number to the second device.

It may be understood that, to determine the same first identifier according to the first random number, the first device and the second device need to obtain the same first random number. Therefore, if the first device generates the first random number, the first device may send the generated first random number to the first device. Alternatively, if the second device generates the first random number, the second device may send the generated first random number to the first device. Alternatively, the third device may allocate the first random number to the first device or the second device, and the first device or the second device that receives the first random number from the third device may then send the first random number to the corresponding second device or first device. Alternatively, the third device may allocate the same first random number to the first device and the second device.

Optionally, in this embodiment of this application, the first random number may be carried in a newly defined message (for example, a message specifically used to send the first random number is defined), or the first random number may be carried in a non-newly defined existing message. This is not limited in this embodiment of this application.

It should be noted that in S301, there is no timing restriction between the first device obtaining the first random number and the second device obtaining the first random number.

For S302, after the first device and the second device obtain the first random number, the same first identifier can be generated. The first identifier can be used for subsequent interaction between the first device and the second device, which is specifically described below.

For example, in this embodiment of this application, the first identifier may be a PMKID. This solution can be applied to WiFi access scenarios.

It may be understood that in this embodiment of this application, for the first device and the second device to determine the same first identifier according to the first random number, rules respectively configured by the first device and the second device for determining the first identifier according to the first random number are the same.

Optionally, before the first device and the second device determine the first identifier according to the first random number, the first device and the second device may mutually perform authentication on each other. In a possible implementation, before the first device determines the first identifier according to the first random number, the first device may send a third message to the second device, where the third message includes signature information of the first device, and the third message is used for requesting the second device to perform verification on the first device according to the signature information of the first device. After the second device receives the third message, if it is determined according to the signature information of the first device carried in the third message that the verification of the first device succeeds, it the first identifier is determined (generated) according to the obtained first random number; otherwise, the second device does not generate the first identifier. After generating the first identifier, the second device sends a fourth message to the first device, where the fourth message includes signature information of the second device, and the fourth message is used for requesting the first device to perform verification on the second device according to the signature information of the second device. After the first device receives the fourth message, if it is determined according to the signature information of the second device carried in the fourth message that the verification of the second device succeeds, the first identifier is generated according to the first random number; otherwise, the first device does not generate the first identifier. The fourth message may also be understood as a response message to the third message.

Based on this solution, the first device and the second device can mutually perform authentication on each other, and then determine the first identifier according to the first random number after the authentication succeeds, thereby further protecting information security.

Optionally, if the first device generates the first random number and sends the first random number to the second device, the first device may carry the first random number in the third message, and the second device may determine the first random number according to the received third message. Optionally, in this case, to maintain signaling consistency, the fourth message returned by the second device may also carry the first random number. Alternatively, if the second device generates the first random number and sends the first random number to the first device, the second device may carry the first random number in the fourth message, and the first device can determine the first random number according to the received fourth message.

In this embodiment of this application, the signature information of the device may be credential information of the device, or may be referred to as a letter of introduction.

For example, in this embodiment of this application, the third message may be a peer discovery request (peer discovery request) message. Correspondingly, the fourth message may be a peer discovery response (peer discovery response) message.

Optionally, in this embodiment of this application, the signature information of the first device may be connector (connector) information sent by a configurator to the first device in a device provisioning protocol (device provisioning protocol, DPP) configuration process, for example, Connector A information. The signature information of the second device may also be connector information sent by the configurator to the second device in the DPP configuration process, such as Connector B information.

Optionally, in this embodiment of this application, the third message and/or the fourth message may further include a transaction ID (transaction ID) and information. The transaction ID information may be used to determine the fourth message in response to the third message. For example, the third message sent by the first device includes transaction ID1. If the fourth message received by the first device includes transaction ID1, the first device can determine that the fourth message is a response message to the previously sent third message. If the fourth message does not include transaction ID1, the first device may discard the fourth message.

The following describes how to determine the first identifier according to the first random number in scenario 1. In a possible implementation, the first identifier may be obtained by performing one or more hash (hash) operations based on a public key of the first device, a public key of the second device, and the first random number.

For example, a calculation rule of the first identifier can satisfy the following relationship:

$$PMKID=truncate\text{-}128(SHA256(min(\text{public key of the first device, public key of the second device})||max(\text{public key of the first device, public key of the second device})||\text{first random number}))\quad \text{formula(1)}.$$

Optionally, the second device may determine the public key of the first device according to the signature information of the first device in the third message. The first device may determine the public key of the second device according to the signature information of the second device in the fourth message.

To avoid ambiguity, some operation symbols in formula (1) are explained herein: truncate means numeric interception, for example, truncate-128 (256 bit) means interception of 128 bits of 256 bit; SHA means secure hash/hash algorithm (secure hash algorithm); min means taking the minimum value; and max means taking the maximum value.

The PMKID is the first identifier. The first identifier is the whole value or part of the value of the operation result obtained after the operation of formula (1).

Optionally, in this embodiment of this application, the first identifier may be calculated based on at least the public key of the first device, the public key of the second device, and the first random number. In other words, in practical applications, the calculation of the first identifier may alternatively be based on other parameters or information. This is not limited in this embodiment of this application.

Scenario 2: The first device and the second device determine (generate) the first identifier according to the first random number and a third random number.

In scenario 2, both the first device and the second device need to obtain the first random number and the second random number. In this embodiment of this application, the first device may obtain the third random number in the following manner:

the first device generates the third random number; or the first device receives the third random number from the second device. Specifically, the second device sends the generated third random number to the first device.

Alternatively, the first device receives the third random number from the third device. Specifically, the third device sends the generated third random number to the first device.

In this embodiment of this application, the second device may obtain the third random number in the following manner:

the second device generates the third random number; or the second device receives the third random number from the first device. Specifically, the first device sends the generated third random number to the second device.

Alternatively, the second device receives the third random number from the third device. Specifically, the third device sends the generated third random number to the second device.

Referring to the foregoing description of scenario 1, the third random numbers obtained by the first device and the second device are the same. Therefore, if the first device generates the third random number, the first device may send the generated third random number to the first device. Alternatively, if the second device generates the third random number, the second device may send the generated third random number to the first device. Alternatively, the third device may allocate the third random number to the first device or the second device, and the first device or the second device that receives the third random number from the third device may then send the third random number to the corresponding second device or first device. Alternatively, the third device may allocate the same third random number to the first device and the second device.

Optionally, in this embodiment of this application, the third random number may be carried in a newly defined message (for example, a message specifically used to send the third random number is defined), or the third random number may be carried in a non-newly defined existing message. This is not limited in this embodiment of this application.

It should be noted that embodiments of this application do not limit the first device or the second device to obtain the first random number and the third random number in the same manner. For example, the first device may generate the first random number and receive the third random number from the second device. The second device may generate the third random number and receive the first random number from the first device.

It should be noted that in S301, there is no timing restriction between the first device obtaining the third random number and the second device obtaining the third random number.

For S302, after the first device and the second device obtain the first random number and the third random number, the same first identifier can be generated. It may be understood that in this embodiment of this application, for the first device and the second device to determine the same first identifier according to the first random number and the third random number, rules respectively configured by the first device and the second device for determining the first identifier according to the first random number and the third random number are the same.

For example, in scenario 2, the first random number may be a current temporary MAC address of the first device (which may also be referred to as a first temporary MAC address of the first device), and the third random number may be a current temporary MAC address of the second device (which may also be referred to as a first temporary MAC address of the second device). Based on this solution, the temporary MAC addresses of the devices at both ends can be used to determine the first identifier without consuming resources to generate additional random numbers.

Optionally, before the first device and the second device determine the first identifier according to the first random number and the third random number, the first device and the second device may mutually perform authentication on each other. For details, refer to the foregoing description of scenario 1. Details are not described herein.

The following describes how to determine the first identifier according to the first random number and the third random number in scenario 2.

In a possible implementation, the first identifier is obtained by performing one or more hash operations based on the public key of the first device, the public key of the second device, the first random number, and the third random number.

For example, a calculation rule of the first identifier can satisfy the following relationship:

$$PMKID\text{-}truncate\text{-}128(SHA256(min(\text{public key of the first device, public key of the second device}))\\ |max(\text{public key of the first device, public key of the second device})|\text{first random number}|\text{third random number})) \qquad \text{formula(2)}.$$

Optionally, the second device may determine the public key of the first device according to the signature information of the first device in the third message. The first device may determine the public key of the second device according to the signature information of the second device in the fourth message.

For the meaning of the operation symbols in formula (2), refer to the foregoing description of formula (1). Details are not described herein.

The PMKID is the first identifier. The first identifier is the whole value or part of the value of the operation result obtained after the operation of formula (2).

Optionally, in this embodiment of this application, the first identifier may be calculated based on at least the public key of the first device, the public key of the second device, the first random number, and the third random number. In other words, in practical applications, the calculation of the first identifier may alternatively be based on other parameters or information. This is not limited in this embodiment of this application.

In another possible implementation, the first identifier is obtained by performing one or more hash operations based on a first key corresponding to the first identifier, the first random number, and the third random number.

For example, a calculation rule of the first identifier can satisfy the following relationship:

$$PMKID\text{=}truncate\text{-}128(HMAC\text{-}SHA\text{-}256/384(PMK, \text{"PMK Name"}|\text{first random number}|\text{second random number})) \qquad \text{formula (3)}.$$

The PMKID is the first identifier; the PMK is the first key corresponding to the first identifier; and PMK Name is the name of the parameter.

To avoid ambiguity, some operation symbols in formula (3) are explained herein: HAMC is a hash message authentication code. For other operation symbols, refer to the description of formula (1) above. Details are not described herein.

The first identifier is the whole value or part of the value of the operation result obtained after the operation of formula (3).

Optionally, in this embodiment of this application, the first identifier may be calculated based on at least the first key corresponding to the first identifier, the first random number, and the third random number. In other words, in practical applications, the calculation of the first identifier may alternatively be based on other parameters or information. This is not limited in this embodiment of this application.

In this embodiment of this application, after both the first device and the second device determine the first identifier, a cached result corresponding to the first identifier is established. For example, if the first identifier is a PMKID, the created cached result may be a PMKSA.

For S303, in this embodiment of this application, the first device sends the first message carrying the first identifier to the second device, where the first message indicates the second device to perform authentication with the first device according to the cached result corresponding to the first identifier. If the second device determines that the first identifier generated by the second device is the same as the first identifier carried in the first message, the second device can determine that there is a cached result corresponding to the first identifier carried in the first message, and the second device and the first device perform authentication according to the cached result. If the second device determines that the first identifier generated by the second device is not the same as the first identifier carried in the first message, the second device may determine that there is no cached result corresponding to the first identifier carried in the first message, and the second device refuses to perform authentication, or the second device indicates the first device to re-initiate new authentication. If the authentication succeeds, the first device establishes a connection to the second device. If the authentication fails, the first device does not establish a connection to the second device, or the first device re-initiates new authentication.

In this embodiment of this application, that the first device establishes a connection to the second device means that the first device and the second device can encrypt data transmitted between each other.

Optionally, in this embodiment of this application, if the second device successfully authenticates with the first device, the second device may send a confirmation message indicating successful authentication to the first device.

It should be noted that in this embodiment of this application, the authentication performed according to the cached result corresponding to the first identifier and the new authentication re-initiated by the first device are different authentication manners.

For example, in this embodiment of this application, when the first identifier is a PMKID, the cached result corresponding to the first identifier is a PMKSA. After the second device receives the first message sent by the first device, if it is determined according to the PMKID carried in the first message that the corresponding PMKSA exists, the second device can perform 4-way handshake or FILS authentication with the first device for quick authentication. If the second device determines that the PMKSA corresponding to the PMKID carried in the first message does not exist, the second device refuses to perform authentication, or the second device indicates the first device to re-initiate new authentication. The re-initiated new authentication is, for example, full IEEE 802.1X authentication.

Optionally, in this embodiment of this application, when the first identifier is a PMKID, establishing a connection between the first device and the second device may be to establish a new temporary session key security association PTKSA (establish fresh pairwise transient key security association, establish fresh PTKSA). The PTK is used to encrypt data transmitted by the first device and the second device after establishing a connection. The PTKSA is a cached result corresponding to the PTA.

For example, in this embodiment of this application, the first message may be an association request (association request)/association request frame (association request frame), a re-association request (re association request)/re-association request frame (re association request frame), or a FILS association (FILS authentication)/FILS association frame (FILS authentication frame).

For S304 to S306, in this embodiment of this application, after the first device and the second device establish a connection, the devices at both ends may further update the first identifier and perform authentication again according to the updated first identifier, to further protect the first identifier. S304 to S306 are described below based on different scenarios.

Scenario 1: The first device and the second device determine (generate) the first identifier according to the first random number. In this scenario, the first device and the second device need to obtain the same second random number, and update the first identifier according to the second random number to obtain the updated first identifier.

In this embodiment of this application, the updated first identifier may also be referred to as the second identifier. This is not limited in this embodiment of this application.

For S304, in this embodiment of this application, the first device may obtain the second random number in the following manner:

the first device generates the second random number; or the first device receives the second random number from the second device. Specifically, the second device sends the generated third random number to the first device.

Alternatively, the first device receives the second random number from a third device. Specifically, the third device sends the generated third random number to the first device.

In this embodiment of this application, the second device may obtain the second random number in the following manner:

the second device generates the second random number; or the second device receives the second random number from the first device. Specifically, the first device sends the generated second random number to the second device.

Alternatively, the second device receives the second random number from the third device. Specifically, the third device sends the generated second random number to the second device.

It may be understood that, for the first device and the second device to obtain the same second random number, if the first device generates the second random number, the first device may send the generated second random number to the first device. Alternatively, if the second device generates the second random number, the second device may send the generated second random number to the first device. Alternatively, the third device may allocate the second random number to the first device or the second device, and the first device or the second device that receives the second random number from the third device may then send the second random number to the corresponding second device or first device. Alternatively, the third device may allocate the same second random number to the first device and the second device.

Optionally, in this embodiment of this application, the second random number may be carried in a newly defined message (for example, a message specifically used to send the second random number is defined), or the second random number may be carried in a non-newly defined existing message. This is not limited in this embodiment of this application.

It should be noted that in S304, there is no timing restriction between the first device obtaining the second random number and the second device obtaining the second random number.

For S305, after the first device and the second device obtain the second random number, for how to update the first identifier according to the second random number to obtain the updated first identifier, refer to the foregoing description of how to determine the first identifier according to the first random number in S301.

Scenario 2: The first identifier is determined according to the first random number and the second random number. In this scenario, the first device and the second device need to obtain the same second random number and the fourth random number, and update the first identifier according to the second random number and the fourth random number to obtain the updated first identifier.

In this embodiment of this application, the first device may obtain the fourth random number in the following manner:

the first device generates the fourth random number; or
the first device receives the fourth random number from the second device. Specifically, the second device sends the generated fourth random number to the first device.

Alternatively, the first device receives the fourth random number from a third device. Specifically, the third device sends the generated fourth random number to the first device.

In this embodiment of this application, the second device may obtain the fourth random number in the following manner:

the second device generates the fourth random number; or
the second device receives the fourth random number from the first device. Specifically, the first device sends the generated fourth random number to the second device.

Alternatively, the second device receives the fourth random number from the third device. Specifically, the third device sends the generated fourth random number to the second device.

It may be understood that, for the first device and the second device to obtain the same fourth random number, if the first device generates the second random number, the first device may send the generated fourth random number to the first device. Alternatively, if the second device generates the fourth random number, the second device may send the generated fourth random number to the first device. Alternatively, the third device may allocate the fourth random number to the first device or the second device, and the first device or the second device that receives the fourth random number from the third device may then send the fourth random number to the corresponding second device or first device. Alternatively, the third device may allocate the same fourth random number to the first device and the second device.

Optionally, in this embodiment of this application, the fourth random number may be carried in a newly defined message (for example, a message specifically used to send the fourth random number is defined), or the fourth random number may be carried in a non-newly defined existing message. This is not limited in this embodiment of this application.

It should be noted that, in this embodiment of this application, there is no timing restriction between the first device obtaining the fourth random number and the second device obtaining the fourth random number.

For S305, after the first device and the second device obtain the second random number and the fourth random number, for how to update the first identifier according to the second random number and the fourth random number to obtain the updated first identifier, refer to the foregoing description of how to determine the first identifier according to the first random number and the third random number in S301.

For S306, for how the second device performs authentication according to the second message from the first device, refer to the process of performing authentication according to the first message described above. Details are not described herein again.

For the solution of updating the first identifier described in S304 to S306, in this embodiment of this application, the update may be initiated by the first device, the second device, or the third device.

In a possible implementation, the first device initiates updating of the first identifier. For example, in scenario 1, after generating the second random number, the first device sends the second random number to the second device. After receiving the second random number, the second device updates the first identifier according to the second random number to obtain the updated first identifier. The first device also updates the first identifier according to the second random number to obtain the updated first identifier. After updating the first identifier, the first device sends a second message carrying the updated first identifier to the second device, where the second message indicates the second device to perform authentication with the first device according to a cached result corresponding to the updated first identifier.

For example, in scenario 2, after generating the second random number, the first device sends the second random number to the second device. After receiving the second random number, the second device generates a fourth random number, and updates the first identifier according to the second random number and the fourth random number to obtain the updated first identifier. The second device then sends the fourth random number to the first device. After receiving the fourth random number, the first device updates the first identifier according to the second random number and the fourth random number to obtain the updated first identifier. The first device sends a second message carrying the updated first identifier to the second device, where the second message indicates the second device to perform authentication with the first device according to a cached result corresponding to the updated first identifier.

In another possible implementation, the second device initiates updating of the second identifier. For example, in scenario 1, the second device generates a second random number and sends the second random number to the first device. After receiving the second random number, the first device updates the first identifier according to the second random number to obtain the updated first identifier. The second device also updates the first identifier according to the second random number to obtain the updated first identifier. After updating the first identifier, the first device sends a second message carrying the updated first identifier to the second device, where the second message indicates the second device to perform authentication with the first device according to a cached result corresponding to the updated first identifier.

For example, in scenario 2, the second device generates a second random number and sends the second random number to the first device. After receiving the second random number, the first device generates a fourth random number, and updates the first identifier according to the second random number and the fourth random number to obtain the updated first identifier. The first device then sends the fourth random number to the second device. After receiving the fourth random number, the second device updates the first identifier according to the second random number and the fourth random number to obtain the updated first identifier. The first device sends a second message carrying the updated first identifier to the second device, where the second message indicates the second device to perform authentication with the first device according to a cached result corresponding to the updated first identifier.

In still another possible implementation, the third device initiates the updating. For example, after the third device generates the second random number (and the fourth random number), the second random number (and the fourth random number) can be sent to the first device or the second device. The first device or the second device that receives the second random number (the fourth random number) sends the second random number (and the fourth random number) to the corresponding second device or first device to complete updating of the first identifier. Alternatively, after the third device generates the second random number (and the fourth random number), the second random number (and the fourth random number) is sent to the first device and the second device. After the first device and the second device update the first identifier according to the second random number (and the fourth random number), the first device sends the second message carrying the updated first identifier to the second device to complete updating of the first identifier. For details, refer to the above-described implementation of the update initiated by the first device or the second device.

In the foregoing implementation of the update initiated by the first device, the second device, or the third device, for the specific implementation in which the first device and the second device exchange the second random number or the fourth random number, refer to the foregoing description of the third message and the fourth message.

Optionally, in this embodiment of this application, the first device, the second device, or the third device updates the first identifier, where the update may be initiated in response to a user operation, or may be periodically initiated according to a pre-configured time period.

For example, in scenario 2, in a case that the first random number and the third random number are temporary MAC addresses, the second random number and the fourth random number may be updated temporary MAC addresses. In other words, in scenario 2, the first device or the second device can update the first identifier synchronously when updating the temporary MAC address. In this case, the first random number is the temporary MAC address of the first device when determining the first identifier (the first temporary MAC address of the first device), and the third random number is the temporary MAC address of the second device when determining the first identifier (the first temporary MAC address of the second device); or the first random number is the first temporary MAC address of the second device, and the third random number is the first temporary MAC address of the first device. The second random number is a second temporary MAC address of the first device obtained by the first device by updating the first temporary MAC address of the first device; and the fourth random number is a second temporary MAC address of the second device obtained by the second device by updating the first temporary MAC address of the second device. Alternatively, the second random number is a second temporary MAC address of the second device obtained by the second device by updating the first temporary MAC address of the second device, and the fourth random number is a second temporary MAC address of the first device obtained by the first device by updating the first temporary MAC address of the first device. This is not limited in this embodiment of this application.

Based on this solution, when updating the temporary MAC addresses, the devices at both ends can synchronously update the first identifier according to the updated temporary MAC addresses without consuming resources to generate additional random numbers for updating the first identifier.

In the foregoing steps S301 to S306, the actions of the first device may be executed by the processor 201 in the communication apparatus 200 shown in FIG. 2 by calling the application program code stored in the memory 203 to instruct the communication apparatus for execution. In the foregoing steps S301 and S306, the actions of the second device may be executed by the processor 201 in the communication apparatus 200 shown in FIG. 2 by calling the application program code stored in the memory 203 to instruct the communication apparatus for execution. This is not limited in this embodiment.

For ease of understanding, the user privacy protection method provided in embodiments of this application is described below with specific examples.

Figure 4:
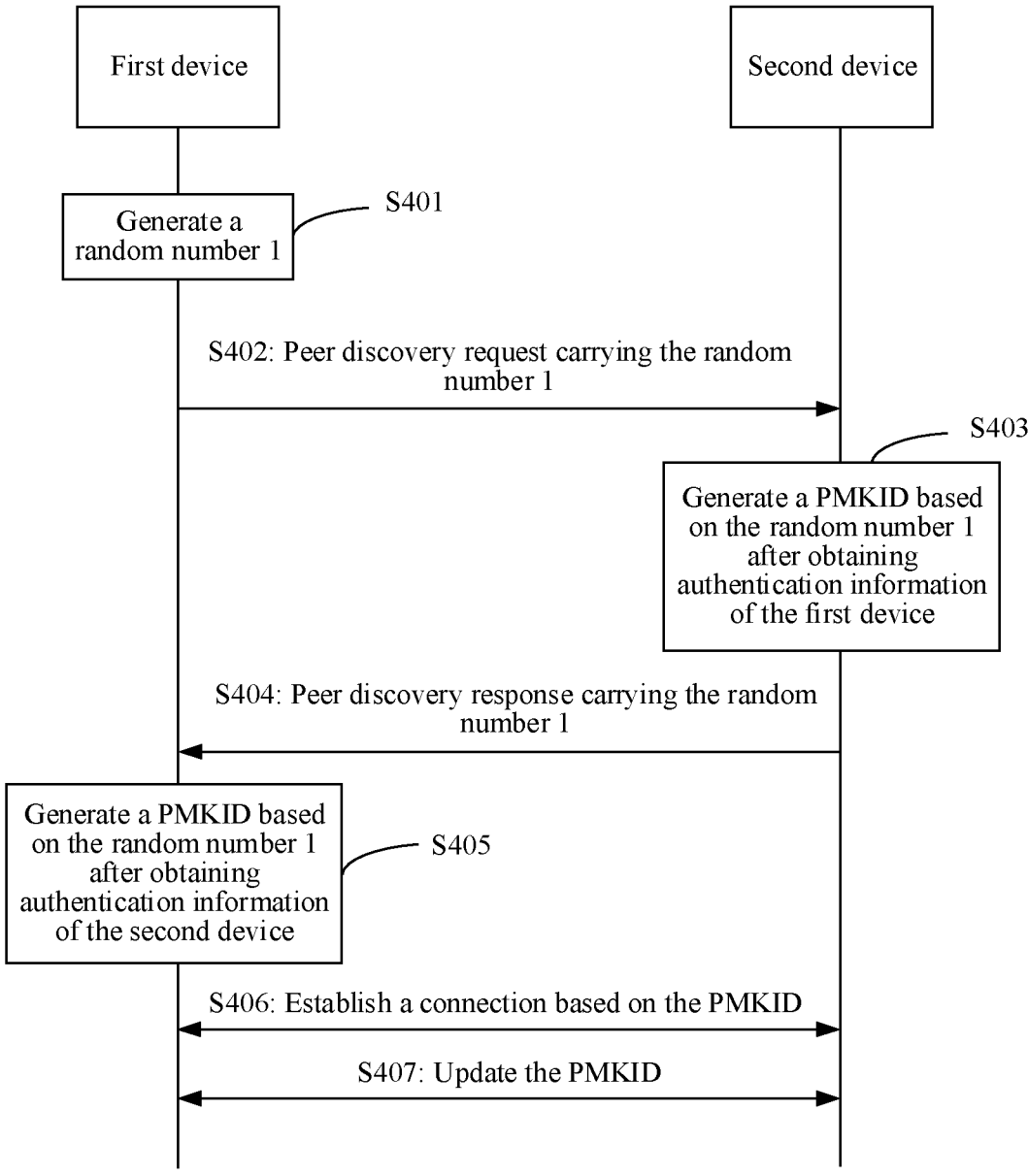
FIG. 4 is a schematic diagram of interaction of an exemplary user privacy method according to an embodiment of this application.

It is assumed that the first identifier is a PMKID. As shown in FIG. 4, in scenario 1, the solution of determining the PMKID by using the random number generated by the first device includes the following S401 to S407:

S401: The first device generates a random number 1.

S402: The first device sends a peer discovery request (peer discovery request) message carrying the random number 1 to the second device.

S403: After obtaining authentication information (connector) of the first device, the second device generates a PMKID based on the random number 1.

The second device verifies the identity of the first device according to the connector information of the first device in the peer discovery request message, and generates, after the verification succeeds, the PMKID based on the random number 1.

S404: The second device sends a peer discovery response (peer discovery response) message carrying the random number 1 to the first device.

S405: After obtaining authentication information (connector) of the second device, the first device generates a PMKID based on the random number 1.

The first device verifies the identity of the second device according to the connector information of the second device in the peer discovery response message, and generates, after the verification succeeds, the PMKID based on the random number 1.

For details about S402 to S405, refer to the description of S301 and S302 above.

S406: The first device and the second device establish a connection based on the PMKID.

For details about S406, refer to the description of S303 above.

S407: The first device and the second device update the PMKID.

For details about S407, refer to the description of S304 to S306 above.

Figure 5:
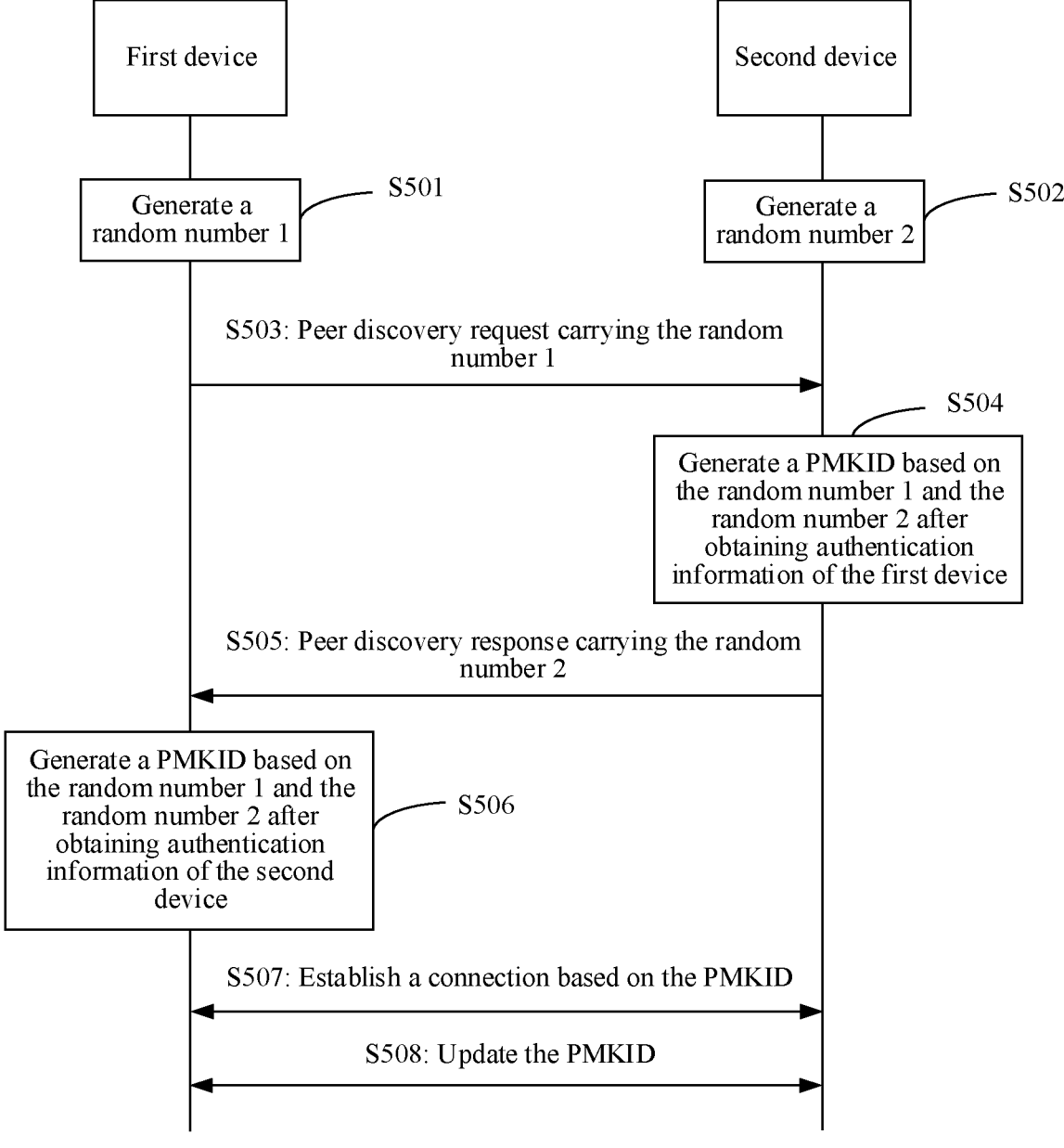
FIG. 5 is a schematic diagram of interaction of another exemplary user privacy method according to an embodiment of this application.

As shown in FIG. 5, in scenario 2, the solution of determining the PMKID by using the random numbers generated by the devices at both ends (the first device and the second device) includes the following S501 to S507:

S501: The first device generates a random number 1.

S502: The second device generates a random number 2.

S503: The first device sends a peer discovery request (peer discovery request) message carrying the random number 1 to the second device.

S504: After obtaining authentication information (connector) of the first device, the second device generates a PMKID based on the random number 1 and the random number 2.

The second device verifies the identity of the first device according to the connector information of the first device in the peer discovery request message, and generates, after the verification succeeds, the PMKID based on the random number 1 and the random number 2.

S505: The second device sends a peer discovery response (peer discovery response) message carrying the random number 2 to the first device.

S506: After obtaining authentication information (connector) of the second device, the first device generates a PMKID based on the random number 1 and the random number 2.

The first device verifies the identity of the second device according to the connector information of the second device in the peer discovery response message, and generates, after the verification succeeds, the PMKID based on the random number 1 and the random number 2.

For details about S502 to S506, refer to the description of S301 and S302 above.

S507: The first device and the second device establish a connection based on the PMKID.

For details about S507, refer to the description of S303 above.

S508: The first device and the second device update the PMKID.

For details about S508, refer to the description of S304 to S306 above.

Figure 6:
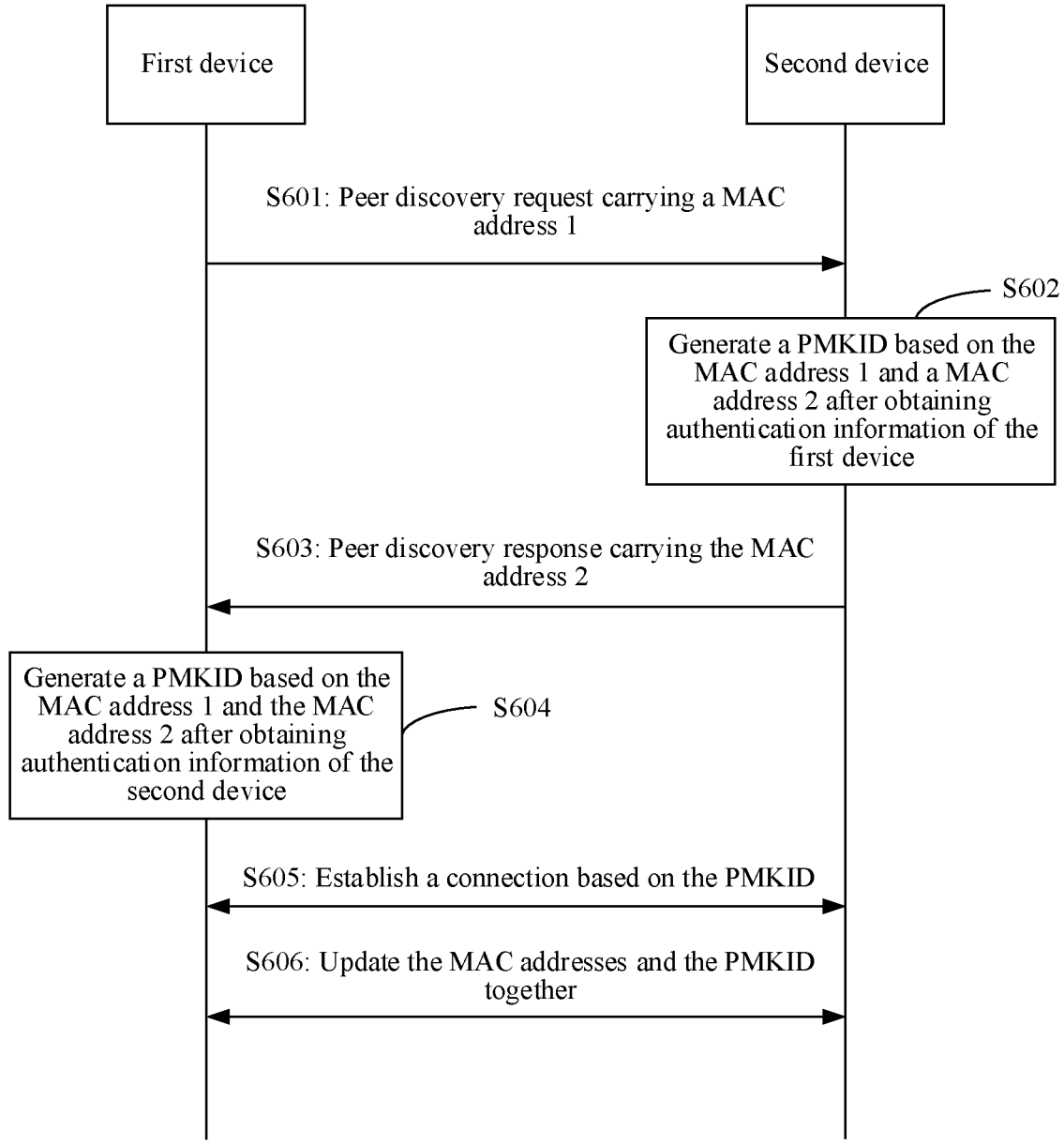
FIG. 6 is a schematic diagram of interaction of still another exemplary user privacy method according to an embodiment of this application.

As shown in FIG. 6, for scenario 2, assuming that the random numbers generated by the devices at both ends (the first device and the second device) are temporary MAC addresses. In other words, the solution of determining the PMKID by using the temporary MAC addresses of the devices at both ends includes the following S601 to S606:

S601: The first device sends a peer discovery request (peer discovery request) message carrying a MAC address 1 to the second device.

The MAC address 1 is a current temporary MAC address of the first device.

S602: After obtaining authentication information (connector) of the first device, the second device generates a PMKID based on the MAC address 1 and a MAC address 2.

The second device verifies the identity of the first device according to the connector information of the first device in the peer discovery request message, and generates, after the verification succeeds, the PMKID based on the MAC address 1 and the MAC address 2. The MAC address 2 is a current temporary MAC address of the second device.

S603: The second device sends a peer discovery response (peer discovery response) carrying the MAC address 2 to the first device.

S604: After obtaining authentication information (connector) of the second device, the first device generates a PMKID based on the MAC address 1 and a MAC address 2.

The first device verifies the identity of the second device according to the connector information of the second device in the peer discovery response message, and generates, after the verification succeeds, the PMKID based on the MAC address 1 and the MAC address 2.

For details about S602 to S604, refer to the description of S301 and S302 above.

S605: The first device and the second device establish a connection based on the PMKID.

For details about S605, refer to the description of S303 above.

S606: The first device and the second device update the MAC addresses (temporary MAC addresses) and the PMKID together.

For details about S606, refer to the description of S304 to S306 above.

It may be understood that, in the foregoing embodiments, methods and/or steps implemented by the first device may also be implemented by a component (for example, a chip or a circuit) that can be used in the terminal device, and methods and/or steps implemented by the second device may also be implemented by a component (for example, a chip or a circuit) that can be used in the network device.

The foregoing mainly describes, from a perspective of interaction between various devices, the solutions provided in embodiments of this application. Correspondingly, an embodiment of this application further provides a communication apparatus, and the communication apparatus is configured to implement the foregoing various methods. The communication apparatus may be the first device in the foregoing method embodiments, an apparatus including the foregoing first device, or a component that can be used in the first device. Alternatively, the communication apparatus may be the second device in the foregoing method embodiments, an apparatus including the foregoing second device, or a component that can be used in the second device. It may be understood that, to implement the foregoing functions, the communication apparatus includes a corresponding hardware structure and/or software module for performing the functions. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each specific application, but it should not be considered that the implementation goes beyond the scope of this application.

In embodiments of this application, the communication apparatus may be divided into functional modules based on the foregoing method embodiments. For example, division into the functional modules may be based on corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 7:
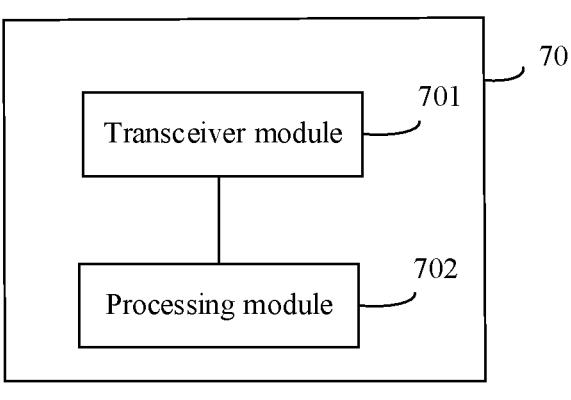
FIG. 7 is a schematic diagram of a structure of another communication apparatus according to an embodiment of this application.

FIG. 7 is a schematic diagram of a structure of a communication apparatus 70. The communication apparatus 70 includes a transceiver module 701 and a processing module 702. The transceiver module 701 may also be referred to as a transceiver unit for implementing transmission and reception functions. For example, the transceiver module may be a transceiver circuit, a transceiver machine, a transceiver, or a communication interface.

For example, the communication apparatus 70 is the first device in the foregoing method embodiments. The processing module 702 is configured to obtain a first random number; the processing module 702 is further configured to determine a first identifier according to the first random number; the transceiver module 701 is configured to send a first message carrying the first identifier to a second device, where the first message indicates the second device to perform authentication with the communication apparatus according to a cached result corresponding to the first identifier; and the communication apparatus establishes a connection to the second device in a case that the authentication succeeds; the processing module 702 is further configured to obtain a second random number; the processing module 702 is further configured to update the first identifier according to the second random number to obtain the updated first identifier; and the transceiver module 701 is further configured to send a second message carrying the updated first identifier to the second device, where the second message indicates the second device to perform authentication with the communication apparatus according to a cached result corresponding to the updated first identifier.

Optionally, that the processing module 702 is configured to obtain a first random number includes: the processing module 702 is configured to generate the first random number; or the processing module 702 is configured to receive the first random number from the second device through the transceiver module 701; or the processing module 702 is configured to receive the first random number from a third device through the transceiver module 701.

Optionally, that the processing module 702 is configured to obtain a second random number includes: the processing module 702 is configured to generate the second random number; or the processing module 702 is configured to receive the second random number from the second device through the transceiver module 701; or the processing module 702 is configured to receive the second random number from the third device through the transceiver module 701.

Optionally, the first identifier is obtained by performing one or more hash operations based on a public key of the communication apparatus, a public key of the second device, and the first random number.

Optionally, that the processing module 702 is further configured to determine a first identifier according to the first random number includes: the processing module 702 is configured to obtain a third random number; and determine the first identifier according to the first random number and the third random number.

Optionally, that the processing module 702 is configured to obtain a third random number includes: the processing module 702 is configured to generate the third random number; or the processing module 702 is configured to receive the third random number from the second device through the transceiver module 701; or the processing module 702 is configured to receive the third random number from the third device through the transceiver module 701.

Optionally, that the processing module 702 is configured to update the first identifier according to the second random number includes: the processing module 702 is configured to obtain a fourth random number, and update the first identifier according to the second random number and the fourth random number to obtain the updated first identifier.

Optionally, that the processing module 702 is configured to obtain a fourth random number includes: the processing module 702 is configured to generate the fourth random number; or the processing module 702 is configured to receive the fourth random number from the second device through the transceiver module 701; or the processing module 702 is configured to receive the fourth random number from the third device through the transceiver module 701.

Optionally, the first random number is a first temporary media access control MAC address of the communication apparatus; and the third random number is a first temporary media access control MAC address of the second device.

Optionally, the first random number is a first temporary MAC address of the communication apparatus; the third random number is a first temporary MAC address of the second device; the fourth random number is a second temporary MAC address of the communication apparatus obtained by the communication apparatus by updating the first temporary MAC address of the communication apparatus; and the fifth random number is a second temporary MAC address of the second device obtained by the second device by updating the first temporary MAC address of the second device.

Optionally, the first identifier is obtained by performing one or more hash operations based on the public key of the communication apparatus, the public key of the second device, the first random number, and the third random number; or the first identifier is obtained by performing one or more hash operations based on a first key corresponding to the first identifier, the first random number, and the third random number.

Optionally, the first identifier is a pairwise master key identifier PMKID, and the first key is a pairwise master key PMK.

Optionally, before the processing module 702 determines the first identifier according to the first random number, the transceiver module 701 is further configured to send a third message to the second device, where the third message includes signature information of the communication apparatus, and the third message is used for requesting the second device to perform verification on the first device according to the signature information of the communication apparatus; and in a case that the verification performed by the second device on the first device succeeds, the transceiver module 701 is further configured to receive a fourth message from the second device, where the fourth message includes signature information of the second device, and the fourth message is used for requesting the communication apparatus to perform verification on the second device according to the signature information of the second device; and that the processing module 702 is configured to determine a first identifier according to the first random number includes: the processing module 702 is configured to determine the first identifier according to the first random number in a case that the verification performed by the processing module on the second device succeeds.

Optionally, the first message is an association request message, a re-association request message, or a fast initial link setup FILS association message.

Optionally, that the first message indicates the second device to perform authentication with the communication apparatus according to a cached result corresponding to the first identifier includes: the first message indicates the second device to perform 4-way handshake with the communication apparatus according to the cached result corresponding to the first identifier; or the first message indicates the second device to perform FILS authentication with the communication apparatus according to the cached result corresponding to the first identifier.

Optionally, the first identifier is a PMKID.

All related content of the steps in the method embodiments may be cited in function descriptions of corresponding functional modules. Details are not described herein again.

For example, the communication apparatus 70 is the second device in the foregoing method embodiments. The processing module 702 is configured to obtain a first random number; the processing module 702 is further configured to determine a first identifier according to the first random number; the transceiver module 701 is configured to receive a first message from a first device, where the first message carries the first identifier, and the first message indicates the communication apparatus to perform authentication with the first device according to a cached result corresponding to the first identifier; the processing module 702 is further configured to determine, in response to determining that the first identifier determined by the communication apparatus is the same as the first identifier carried by the first message, that there is a cached result corresponding to the first identifier, and perform authentication with the first device; the communication apparatus establishes a connection to the first device in a case that the authentication succeeds; the processing module is further configured to obtain a second random number, and update the first identifier according to the second random number to obtain the updated first identifier; and the transceiver module is further configured to receive a second message from the first device, where the second message carries the updated first identifier, and the second message indicates the communication apparatus to perform authentication with the first device according to a cached result corresponding to the updated first identifier.

Optionally, that the processing module 702 is configured to obtain a first random number includes: the processing module 702 is configured to generate the first random number; or the processing module 702 is configured to receive the first random number from the first device through the transceiver module 701; or the processing module 702 is configured to receive the first random number from a third device through the transceiver module 701.

Optionally, that the processing module 702 is configured to obtain a second random number includes: the processing module 702 is configured to generate the second random number; or the processing module 702 is configured to receive the second random number from the first device through the transceiver module 701; or the processing module 702 is configured to receive the second random number from the third device through the transceiver module 701.

Optionally, the first identifier is obtained by performing one or more hash operations based on a public key of the first device, a public key of the second device, and the first random number.

Optionally, that the processing module 702 is further configured to determine a first identifier according to the first random number includes: the processing module 702 is configured to obtain a third random number; and determine the first identifier according to the first random number and the third random number.

Optionally, that the processing module 702 is configured to obtain a third random number includes: the processing module 702 is configured to generate the third random number; or the processing module 702 is configured to receive the third random number from the first device through the transceiver module 701; or the processing module is configured to receive the third random number from the third device through the transceiver module 701.

Optionally, that the processing module 702 is configured to update the first identifier according to the second random number includes: the processing module 702 is configured to obtain a fourth random number, and update the first identifier according to the second random number and the fourth random number to obtain the updated first identifier.

Optionally, that the processing module 702 is configured to obtain a fourth random number includes: the processing module 702 is configured to generate the fourth random number; or the processing module 702 is configured to receive the fourth random number from the first device through the transceiver module 701; or the processing module 702 is configured to receive the fourth random number from the third device through the transceiver module 701.

Optionally, the first random number is a first temporary media access control MAC address of the first device; and the third random number is a first temporary media access control MAC address of the second device.

Optionally, the first random number is a first temporary MAC address of the first device; the third random number is a first temporary MAC address of the communication apparatus; the second random number is a second temporary MAC address of the first device obtained by updating the first temporary MAC address of the first device; and the fourth random number is a second temporary MAC address of the second device obtained by updating the first temporary MAC address of the communication apparatus.

Optionally, the first identifier is obtained by performing one or more hash operations based on the public key of the first device, the public key of the communication apparatus, the first random number, and the third random number; or the first identifier is obtained by performing one or more hash operations based on a first key corresponding to the first identifier, the first random number, and the third random number.

Optionally, the first identifier is a pairwise master key identifier PMKID, and the first key is a pairwise master key PMK.

Optionally, that the processing module 702 is configured to determine the first identifier according to the first random number includes: the processing module 702 is configured to receive a third message from the first device through the transceiver module 701, where the third message includes signature information of the first device, and the third message is used for requesting the communication apparatus to perform verification on the first device according to the signature information of the first device; and the processing module 702 determines the first identifier according to the first random number in a case that the verification performed by the processing module 702 on the first device succeeds. That the transceiver module 701 is configured to receive a first message from the first device includes: the transceiver module 701 sends a fourth message to the first device, where the fourth message includes signature information of the second device, and the fourth message is used for requesting to perform verification on the second device according to the signature information of the communication apparatus; and receives the first message from the first device in a case that the verification performed by the first device on the communication apparatus succeeds.

Optionally, the first message is an association request message, a re-association request message, or a fast initial link setup FILS association message.

Optionally, that the first message indicates the communication apparatus to perform authentication with the first device according to a cached result corresponding to the first identifier includes: the first message indicates the communication apparatus to perform 4-way handshake with the first device according to the cached result corresponding to the first identifier; or the first message indicates the communication apparatus to perform FILS authentication with the first device according to the cached result corresponding to the first identifier.

Optionally, the first identifier is a PMKID.

In this embodiment, the communication apparatus 70 is presented with the functional modules implemented through integration. The "module" herein may be a specific ASIC, a circuit, a processor and a memory that execute one or more software or firmware programs, an integrated logic circuit, and/or another component that can provide the foregoing functions.

In a simple embodiment, a person skilled in the art may figure out that the communication apparatus 70 may use the form of the communication apparatus 200 shown in FIG. 2.

For example, the processor 201 in the communication apparatus 200 shown in FIG. 2 may call the computer-executable instructions stored in the memory 203, so that the communication apparatus 200 performs the user privacy protection method in the foregoing method embodiments. Specifically, functions/implementation processes of the transceiver module 701 and the processing module 702 in FIG. 7 may be implemented by the processor 201 in the communication apparatus 200 shown in FIG. 2 by invoking the computer executable instructions stored in the memory 203. Alternatively, a function/implementation process of the processing module 502 in FIG. 7 may be implemented by the processor 201 in the communication apparatus 200 shown in FIG. 2 by calling the computer executable instructions stored in the memory 203, and a function/implementation process of the transceiver module 701 in FIG. 7 may be implemented by the communication interface 204 in the communication apparatus 200 shown in FIG. 2.

The communication apparatus 70 provided in this embodiment may perform the foregoing user privacy protection method. Therefore, for technical effects that can be achieved by the communication apparatus, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a SoC (system-on-a-chip) or an ASIC, or may be an independent semiconductor chip. The processor includes a core for executing software instructions to perform operations or processing, and may further include a necessary hardware accelerator, for example, a field programmable gate array (field programmable gate array, FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processing (digital signal processing, DSP) chip, a microcontroller unit (microcontroller unit, MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system, including at least one processor and an interface, where the at least one processor is coupled to a memory through the interface, and when the at least one processor executes a computer program or an instruction in the memory, the method according to any one of the foregoing method embodiments is enabled to be executed. In a possible implementation, the communication apparatus further includes a memory. Optionally, the chip system may include a chip, or may include a chip and another discrete device. This is not specifically limited in this embodiment of this application.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, all or some of the processes or functions according to embodiments of this application are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to embodiments, in a process of implementing this application that claims protection, a person skilled in the art may understand and implement another variation of the disclosed embodiments by viewing the appended drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are set forth in dependent claims that are different from each other, but this does not mean that these measures cannot be combined to produce a great effect.

Although this application is described with reference to specific features and all the embodiments thereof, it is clear that various modifications and combinations may be made to them without departing from the spirit and scope of this application. Correspondingly, this specification and the accompanying drawings are merely example description of this application defined by the appended claims, and are considered as any or all of modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:

obtaining a first random number;

sending a first message carrying a first identifier to a second device, wherein the first identifier is based on the first random number, wherein the first message indicates to the second device to perform authentication with a first device according to a cached result corresponding to the first identifier responsive to the first identifier being the same as an identifier generated by the second device, and wherein the cached result is a result of a previous successful authentication between the first device and the second device;

establishing a connection to the second device when the authentication succeeds;

obtaining a second random number;

updating the first identifier according to the second random number to obtain an updated first identifier; and sending a second message carrying the updated first identifier to the second device, wherein the second message indicates to the second device to perform authentication with the first device according to a cached result corresponding to the updated first identifier.

2. The method of claim 1, wherein obtaining the first random number comprises a) generating the first random number, b) receiving the first random number from the second device, or c) receiving the first random number from a third device.

3. The method of claim 1, wherein obtaining the second random number comprises a) generating the second random number, b) receiving the second random number from the second device, or c) receiving the second random number from a third device.

4. The method of claim 1, wherein the first identifier is obtained by performing one or more hash operations based on a public key of the first device, a public key of the second device, and the first random number.

5. The method of claim 1, further comprising obtaining a third random number, wherein the first identifier is based on the first random number and the third random number.

6. The method of claim 5, wherein obtaining the third random number comprises a) generating the third random number, b) receiving the third random number from the second device, or c) receiving the third random number from a third device.

7. The method of claim 5, wherein updating the first identifier according to the second random number comprises:

obtaining a fourth random number; and updating the first identifier according to the second random number and the fourth random number to obtain the updated first identifier.

8. The method of claim 7, wherein obtaining the fourth random number comprises a) generating the fourth random number, b) receiving the fourth random number from the second device, or c) receiving the fourth random number from a third device.

9. The method of claim 7, wherein the first random number is a first temporary media access control (MAC)

address of the first device, wherein the third random number is a first temporary MAC address of the second device, wherein the second random number is a second temporary MAC address of the first device obtained by updating the first temporary MAC address of the first device, and wherein the fourth random number is a second temporary MAC address of the second device obtained by updating the first temporary MAC address of the second device.

10. The method of claim 5, wherein the first random number is a first temporary media access control (MAC) address of the first device, and wherein the third random number is a first temporary MAC address of the second device.

11. The method of claim 5, wherein the first identifier is obtained by either a) performing one or more hash operations based on a public key of the first device, a public key of the second device, the first random number, and the third random number, or b) performing one or more hash operations based on a first key corresponding to the first identifier, the first random number, and the third random number.

12. The method of claim 11, wherein the first identifier is a pairwise master key identifier (PMKID) and the first key is a pairwise master key (PMK).

13. The method of claim 1, wherein before the first identifier is determined according to the first random number, the method further comprises: sending a third message to the second device, wherein the third message comprises signature information of the first device, and wherein the third message requests the second device to perform verification on the first device according to the signature information of the first device; and receiving a fourth message from the second device when the verification performed by the second device on the first device succeeds, wherein the fourth message comprises signature information of the second device, and wherein the fourth message requests the first device to perform verification on the second device according to the signature information of the second device, wherein the first identifier is determined according to the first random number when the verification performed by the first device on the second device succeeds.

14. The method of claim 1, wherein the first message is an association request message, a re-association request message, or a fast initial link setup (FILS) association message.

15. The method of claim 1, wherein the first message indicating to the second device to perform authentication with the first device according to a cached result corresponding to the first identifier comprises either:

a) the first message indicating to the second device to perform a 4-way handshake with the first device according to the cached result corresponding to the first identifier; or b) the first message indicating to the second device to perform fast initial link setup (FILS) authentication with the first device according to the cached result corresponding to the first identifier.

16. The method of claim 1, wherein the first identifier is a pairwise master key identifier (PMKID).

17. A first device, comprising:

one or more processors; and a memory coupled to the one or more processors and configured to store instructions that, when executed by the one or more processors, cause the first device to be configured to:

obtain a first random number;

send a first message carrying a first identifier to a second device, wherein the first identifier is based on the first random number, wherein the first message indicates to the second device to perform authentication with the first device according to a cached result corresponding to the first identifier responsive to the first identifier being the same as an identifier generated by the second device, and wherein the cached result is a result of a previous successful authentication between the first device and the second device;

establish a connection to the second device when the authentication succeeds;

obtain a second random number;

update the first identifier according to the second random number to obtain an updated first identifier; and send a second message carrying the updated first identifier to the second device, wherein the second message indicates to the second device to perform authentication with the first device according to a cached result corresponding to the updated first identifier.

18. The first device of claim 17, wherein the first identifier is obtained by performing one or more hash operations based on a public key of the first device, a public key of the second device, and the first random number.

19. The first device of claim 17, wherein the first identifier is based on the first random number and an obtained third random number.

20. A system, comprising:

a first device configured to obtain a first random number, wherein a first identifier is based on the first random number; and a second device configured to obtain a second random number, wherein a second identifier is based on the second random number, wherein the first device is further configured to send a first message carrying the first identifier to the second device, wherein the first message indicates to the second device to perform authentication with the first device according to a cached result corresponding to the first identifier, wherein the second device is further configured to:

determine that there is a cached result corresponding to the first identifier when the second identifier is the same as the first identifier carried by the first message; and perform authentication with the first device according to the cached result, wherein the cached result is a result of a previous successful authentication between the first device and the second device, wherein the first device is further configured to establish a connection to the second device when the authentication succeeds, wherein the first device is further configured to obtain a third random number, and update the first identifier according to the third random number to obtain an updated first identifier;

wherein the second device is further configured to obtain a fourth random number, and update the second identifier according to the fourth random number to obtain an updated second identifier, and wherein the first device is further configured to send a second message carrying the updated first identifier to the second device, wherein the second message indicates to the second device to perform authentication with the first device according to a cached result corresponding to the updated first identifier.

* * * * *